US010882384B2

(12) United States Patent
Remmel

(10) Patent No.: US 10,882,384 B2
(45) Date of Patent: Jan. 5, 2021

(54) TARPAULIN STRUCTURE

(71) Applicant: EUROPEAN TRAILER SYSTEMS GMBH, Moers (DE)

(72) Inventor: Roger Remmel, Remscheid (DE)

(73) Assignee: EUROPEAN TRAILER SYSTEMS GMBH, Moers (DE)

( * ) Notice: Subject to any disclaimer, the term of this patent is extended or adjusted under 35 U.S.C. 154(b) by 0 days.

(21) Appl. No.: 16/162,714

(22) Filed: Oct. 17, 2018

(65) Prior Publication Data

US 2019/0047390 A1 Feb. 14, 2019

Related U.S. Application Data

(63) Continuation of application No. 15/321,860, filed as application No. PCT/DE2015/000304 on Jun. 23, 2015, now Pat. No. 10,131,213.

(30) Foreign Application Priority Data

Jun. 23, 2014 (DE) .................... 20 2014 005 077 U

(51) Int. Cl.
*B60J 7/06* (2006.01)
*B60J 7/185* (2006.01)

(52) U.S. Cl.
CPC ............ *B60J 7/065* (2013.01); *B60J 7/1855* (2013.01); *B60J 7/1856* (2013.01)

(58) Field of Classification Search
CPC . B60J 7/065; B60J 7/1856; B60J 7/061; B60J 7/062; B60J 7/066; B60J 7/1858

(Continued)

(56) References Cited

U.S. PATENT DOCUMENTS 1,827,059 A * 10/1931 Woolcott ................. B60J 7/062
296/105
1,863,957 A 6/1932 Woolcott
(Continued)

FOREIGN PATENT DOCUMENTS

CN 2280016 Y 4/1998
CN 102192337 A 9/2011
(Continued)

OTHER PUBLICATIONS

Notification for Reasons for Refusal dated Jul. 2, 2019 corresponding to Japanese application No. 2017-519782.
(Continued)

*Primary Examiner* — Dennis H Pedder
(74) *Attorney, Agent, or Firm* — Nath, Goldberg & Meyer; Joshua B. Goldberg

(57) ABSTRACT

The invention relates to a tarpaulin structure for a substructure, such as a lorry, trailer, semi-trailer, railway car, dump truck or container, comprising a covering frame and a tarpaulin consisting of weather-resistant material, wherein the covering frame has a plurality of struts (34) which each have on the end sides thereof a carriage (32) that is displaceable along a guide (20), wherein at least one bow (36) is pivotally connected at each pair of opposed carriages (32; 32'), said bow forming with a bow (36) of an adjacent carriage pair (32) a tarpaulin folding aid, the bows (36) of the tarpaulin folding aid being connected to each other. A tarpaulin structure that allows a reliable covering of a substructure while having a low intrinsic weight is achieved according to the invention in that the connected bows (36) comprise a pivot angle limiter (38) that allows only a limited pivoting of the bows (36).

18 Claims, 7 Drawing Sheets

(58) Field of Classification Search
USPC ............... 296/104, 105, 100.12, 100.14, 296/100.16–100.18
See application file for complete search history.

(56) References Cited

U.S. PATENT DOCUMENTS

| | | | |
|---|---|---|---|
| 4,740,029 | A | 4/1988 | Tuerk |
| 5,524,953 | A | 6/1996 | Shaer |
| 5,924,759 | A | 7/1999 | Demonte et al. |
| 6,634,697 | B1 | 10/2003 | Petelka |
| 7,325,855 | B2 | 2/2008 | Henning et al. |
| 7,374,225 | B2 * | 5/2008 | Petelka .................... B60J 7/065 135/133 |
| 8,622,368 | B2 | 1/2014 | Geiser |
| 2007/0063530 | A1 | 3/2007 | Petelka |
| 2008/0302404 | A1 | 12/2008 | Chenowth |

FOREIGN PATENT DOCUMENTS

| | | |
|---|---|---|
| CN | 202080103 U | 12/2011 |
| DE | 33 27 755 A1 | 2/1984 |
| DE | 3418060 A1 | 11/1985 |
| DE | 195 44 619 A1 | 6/1997 |
| DE | 10 2008 000 899 A1 | 10/2009 |
| DE | 10 2012 006 385 A1 | 10/2013 |
| EP | 0 421 554 A1 | 10/1991 |
| EP | 0606730 A1 | 7/1994 |
| EP | 0 778 169 A1 | 6/1997 |
| EP | 0 778 169 B1 | 2/2000 |
| EP | 2 106 947 A1 | 10/2009 |
| ES | 2336407 A1 | 4/2010 |
| FR | 2 653 478 A1 | 4/1991 |
| GB | 2 257 999 A | 1/1993 |
| JP | S53 73620 U | 6/1978 |
| WO | 2012/010618 A1 | 1/2012 |

OTHER PUBLICATIONS

Indian Examination Report dated Nov. 20, 2019, for corresponding IN201717002075.

* cited by examiner

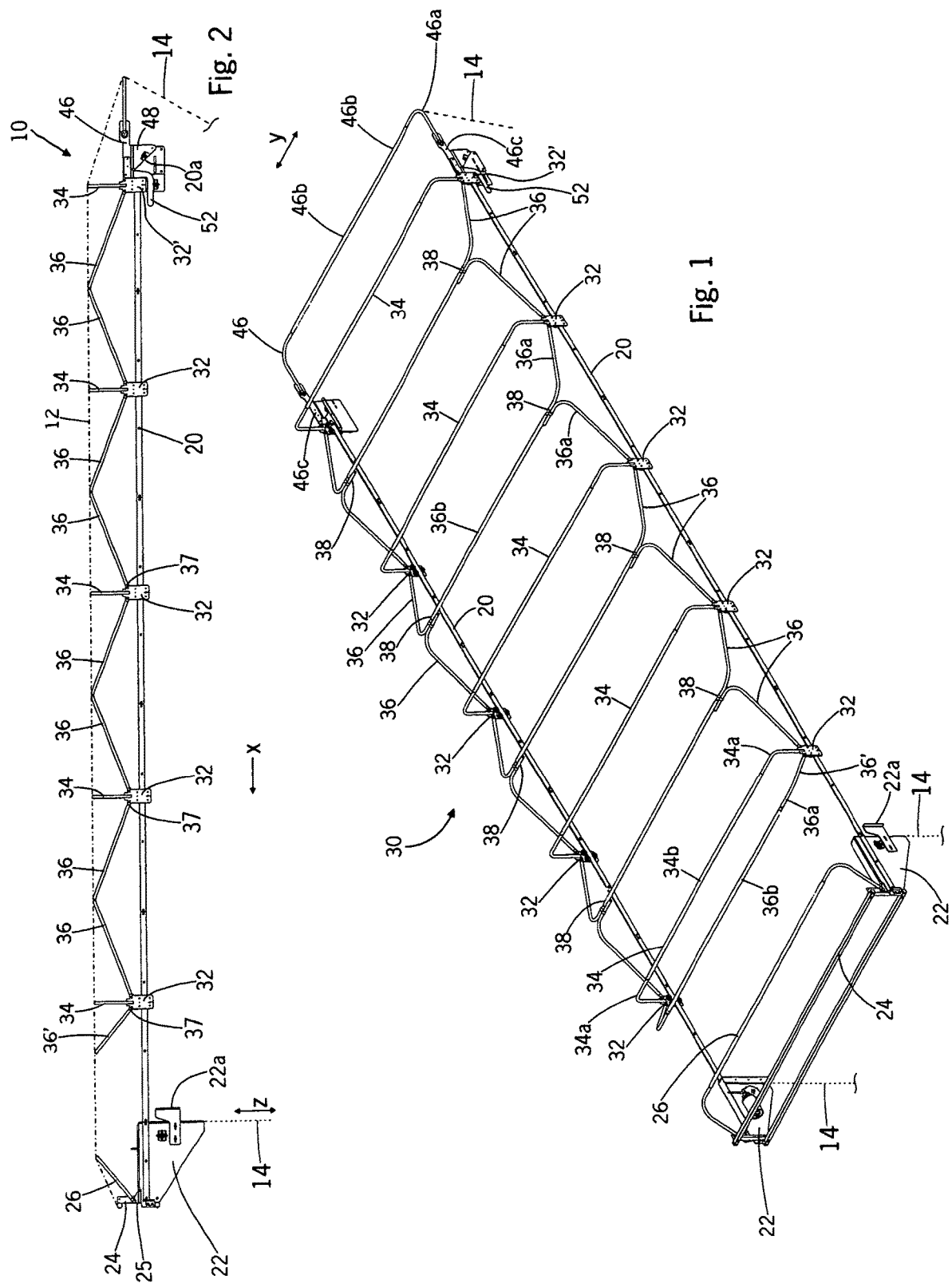

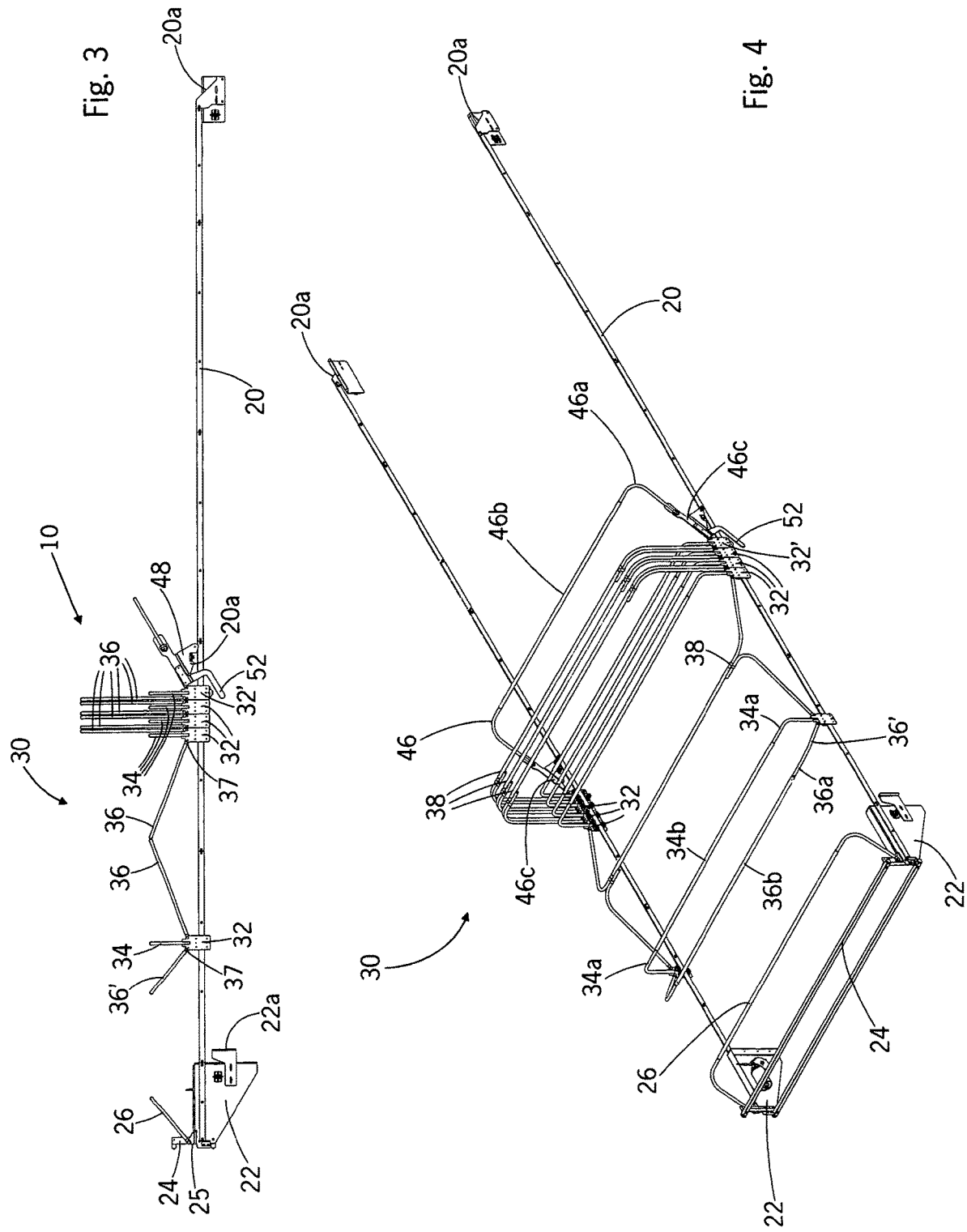

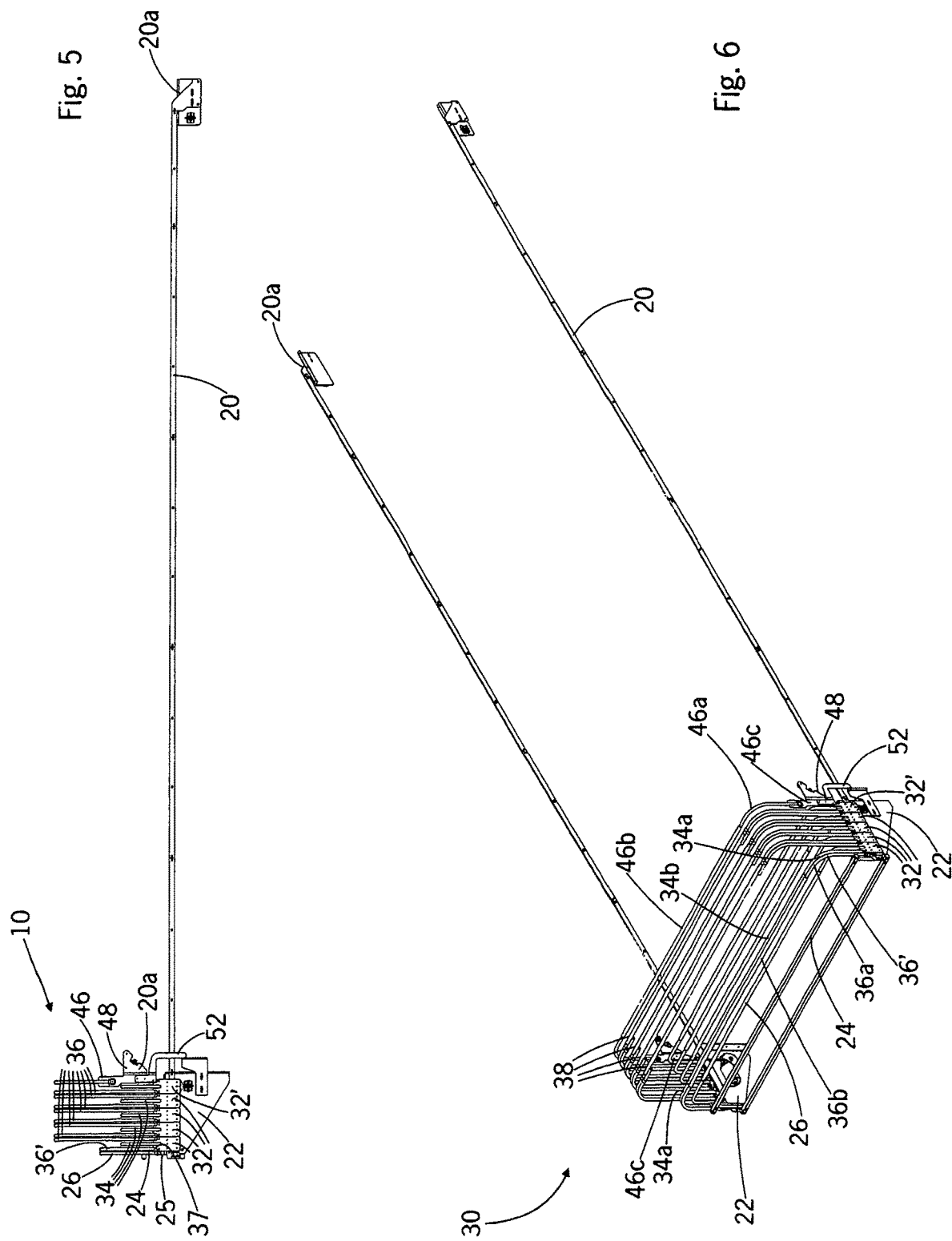

TARPAULIN STRUCTURE

This is a Continuation Application of U.S. patent application Ser. No. 15/321,860, filed Dec. 23, 2016, an application filed as a national stage under 371 of Application No. PCT/DE2015/000304 filed Jun. 23, 2015, and claiming benefit from German Application No. 202014005077.5, filed Jun. 23, 2014, the contents of each of which are hereby incorporated by reference in their entirety.

The invention relates to a tarpaulin structure for a substructure, such as a heavy goods vehicle, trailer, semitrailer, railway carriage, tipper truck or container, comprising a top frame and a tarpaulin composed of weather-resistant material, wherein the top frame has a multiplicity of beams which have, on the ends, in each case a carriage which is displaceable along a guide, wherein, to each pair of oppositely situated carriages, there is pivotably attached at least one bow which, together with a bow of an adjacent carriage pair, forms a tarpaulin folding aid, wherein the bows of the tarpaulin folding aid are connected to one another.

Tarpaulin structures of said type are known from practice for the purposes of opening up openable roofs, wherein, in general, the bows are composed of a pair of rods articulatedly attached to the oppositely situated carriages, which rods, at their ends situated opposite the carriages, in turn have a joint in which a further rod is pivotably mounted. The plate that forms the joint spaced apart from the carriages then has a further joint for the connected bow, which is of similar construction. A disadvantage of the known tarpaulin structures is the fact that the bows have a relatively large angle relative to the horizontal, which duly facilitates the displacement in a vertical direction for the lifting of the tarpaulin, but which practically does not promote the transmission of forces in a displacement direction. In this way, jamming of the carriages that are connected to one another by way of beams easily occurs, leading to blockage of the top frame. As a countermeasure, the beam that rigidly connects the oppositely situated carriages to one another is often of very massive form, which in turn has the disadvantage that the tolerances of the guide must be reduced practically to zero in order that the top frame can be moved. A further disadvantage consists in that the interconnected bows, in the region of their connection, permit a relative movement in the direction of the guide, in the vertical direction and in the transverse direction perpendicular thereto, whereby forces and moments that are introduced into a carriage at one side practically cannot be transmitted via the bow into the adjacent carriage. This has the result that the top frames of the known tarpaulin structures always require a symmetrical introduction of the displacement force, that is to say for example the displacement force must be introduced centrally, but generally must be introduced equally on both sides. A further disadvantage of the known arrangement consists in that it can be pushed together, with folding of the tarpaulin, only in a region of the substructure which still covers the loading opening of the substructure, whereby the loading opening is not fully opened up. This is a disadvantage in particular in the case of railway carriages, because, as a result, a part of the loading space is lost.

U.S. Pat. No. 7,325,855 B2 describes a tarpaulin structure for a semitrailer, which tarpaulin structure is in the form of a sliding-bow top, wherein a tarpaulin composed of weather-resistant material is supported by a top frame. Here, the top frame comprises a multiplicity of U-shaped beams which have, on the ends, in each case one carriage which is displaceable along in each case one lateral guide mounted approximately at the level of the loading area. Above half of the height of the U-shaped beams, there is attached to the beams in each case one short U-shaped bow which is part of a tarpaulin folding aid. To the carriage there is attached in each case one link which is coupled by way of a connecting element to a link attached mirror-symmetrically to the adjacent carriage, wherein a short U-shaped section which lies in a parallel plane with respect to the beams is attached to the connecting element, such that, when the carriages are pushed together, the section is raised as a result of the pivoting-together of the links. A disadvantage of the known tarpaulin structure is in particular that end beams of very stable form are required, which stiffen the tarpaulin structure and which do not become jammed during a displacement along the guide. In this way, a relatively large region is built over, which cannot be opened up without lengthening the loading area. Furthermore, no forces are introduced from the beams into the adjacent beams, such that, during the displacement, the beams tend to become jammed. The arrangement with the links, the connecting element and the section has a tendency to overturn, such that considerable forces are introduced into the tarpaulin as a result. A disadvantage is in particular the fact that numerous joints of the links, levers and sections give rise to a degree of play in the system, which does not allow two adjacent beams to be displaced jointly and in spaced-apart fashion.

EP 0 421 554 A1 describes a tarpaulin structure for a trailer which is in the form of a sliding roof, in the case of which a tarpaulin composed of weather-resistant material is supported on a top frame, and further tarpaulins close off the side walls. The top frame has a multiplicity of links arranged on both sides of a guide in the form of an I-shaped profile in the roof region, which links have, on the ends, a carriage which is captively held by way of support rollers between a lower track and an upper track of the I-shaped profile. The links are coupled in the manner of a chain, wherein, to the link pointing rearward in the opening direction, there is attached a lifting hoop with an approximately rectangular cross-sectional profile, such that a bow is formed which lifts the tarpaulin. The foremost carriage in the closing direction has a vertical captive-holding fork which, in the manner of an abutment, receives a further hoop, which is coupled to an additional lever which crosses the foremost lever, when the tarpaulin structure is closed. In a further embodiment, the rearmost carriage in the closing direction may be in the form of a double-axle carriage which has a lateral dimensionally stable triangle which bears a hoop, wherein the triangle is displaceable about a curved section into a top frame storage region. In said embodiment, the hoop is not fixedly coupled to one of the levers, but rather is articulatedly connected to both lateral links, in order that the system can perform the pivoting movement. The rollers of the carriage, which are captively held in the I-shaped profile guide, prevent the hoop from being able to overturn relative to the links. A disadvantage of the known tarpaulin structure is the fact that the oppositely situated carriages are not coupled to one another in a vertical plane transversely with respect to the displacement direction, such that it is necessary for a drive to be provided on both sides, which drives introduce a displacement movement into the carriages simultaneously.

U.S. Pat. No. 5,924,759 A describes a tarpaulin structure for a substructure in the form of a semitrailer, wherein a top frame which bears a tarpaulin composed of weather-resistant material is built over a loading area in the manner of a sliding-bow top. The top frame has a multiplicity of beams which are of U-shaped form and which have, on the ends, in each case one carriage which is displaceable along a guide in the region of the loading area. To each pair of oppositely situated carriages there is pivotably attached in each case one U-shaped bow which, together with a likewise U-shaped bow of an adjacent carriage pair, forms a tarpaulin folding aid. The bows of the tarpaulin folding aid are in this case connected to one another in the region of their sections which are averted from the carriage and which span the loading area. The guide is in the form of an outwardly pointing, C-shaped double angle piece which provides a guide track, substantially aligned with the loading area, for a support roller, whereas, against an oppositely situated rail of triangular profile, a counterpart roller with complementary triangular profile centers the carriage relative to the guide. A disadvantage of the known tarpaulin structure is in particular the fact that the bows that are connected to one another by the tarpaulin or with the aid of the tarpaulin have a tendency to overturn when the top frame is pushed together, resulting in a blockage. A further disadvantage is the fact that the interconnected bows enclose a very small angle, such that substantially a resultant force introduced vertically is introduced during the displacement of the top frame, without a displacement introduced in a displacement direction of the top frame occurring.

U.S. Pat. No. 6,634,697 B1 describes a tarpaulin structure in the manner of a sliding-bow top, in the case of which a tarpaulin composed of weather-resistant material is attached to a top frame which can be pushed together, wherein the top frame has a multiplicity of U-shaped beams which have, on the ends, in each case one carriage which is displaceable along a guide arranged on both sides in the region of the loading area. In an upper region of the beams, U-shaped short bows are pivotably attached to the beam, which bows assist the folding of the tarpaulin. A disadvantage of the known tarpaulin structure is in particular the fact that very massive end beams must be provided. Nevertheless, all of the beams have a tendency to become jammed in the case of a force being introduced on one side.

FR 2 653 478 A1 describes a tarpaulin structure for a heavy goods vehicle, which tarpaulin structure is formed in the manner of a sliding top, wherein a top frame which bears a tarpaulin composed of weather-resistant material has a multiplicity of beams in the form of hoops, which beams have, on the ends, in each case one carriage which is displaceable along in each case one guide provided on both sides of the roof opening. Here, the guide has a profile with two C-shaped chambers for receiving two support rollers of the carriage, which prevent a lift-off of the support rollers and thus of the carriage from the profile. Furthermore, in an upwardly open chamber of the profile of the guide, there is arranged a guide roller which centers the carriage on the profile with play between the two vertical walls of said chamber. Articulatedly attached to each carriage, so as to point in an opening direction, is a long lever which, on the end averted from the carriages, bears a lifting hoop and thus forms a substantially U-shaped bow. In each case one link arrangement composed of two partial links is attached to the side, facing toward the carriage which bears the bow, of the adjacent carriage, which link arrangement forms a knee joint, wherein the first partial link is connected at one end to the carriage and at the other end to the second partial link. The second partial link is articulatedly connected at the other end to the link of the bow. In the closed state of the tarpaulin, the link arrangement is in approximately stretched-out form, whereas, during the opening of the tarpaulin structure, said link arrangement initially overturns and is lowered until the first partial link lifts the lifting hoop as a result of the carriages being pushed together. The foremost carriage in relation to the opening is in the form of a double carriage which has two substantially inflexible elongate hoops, wherein a latch element with a captive-holding slot is pivotably attached to the foremost carriage in the direction of the opening, which bar element is coupled by way of a bow to an oppositely situated carriage, wherein the captive-holding slot captively holds a protruding peg, which is formed on the guide, in order to generate a locking action. A disadvantage of the known tarpaulin structure is the tendency thereof to become jammed, which makes it necessary or expedient to provide a drive device which is synchronous on both sides. Furthermore, the tarpaulin folding is cumbersome, because an overturning link arrangement is provided. This also does not make it possible for forces from one pair of oppositely situated carriages to be introduced into the adjacent pair, especially as the top frame, which has numerous joints, entails a large amount of play in this regard, which impedes the transmission of forces. To hold the bar element and the bow on the foremost carriage in the direction of the opening in a raised position, it is necessary to provide a cumbersome holding construction with springs which prevents the bar element from falling downward.

DE 10 2012 006 385 A1 describes a tarpaulin structure for a substructure formed in the manner of a semitrailer, in the case of which a top frame which bears a tarpaulin composed of weather-resistant material can, in the manner of a sliding top, open and re-close an opening in the region of a roof. The top frame has a multiplicity of beams in the form of elongate hoops, which beams have, on the ends, in each case one carriage which is displaceable along a guide in the region of the roof opening. In a region adjacent to the guides, the hoops have receptacles for folding aids which locally lift the tarpaulin during the pushing-together of the carriages. An angular end portal is attached to the foremost carriage in the direction of the roof opening, which end portal is captively held by way of rollers on the guide which also guides support rollers of the carriages. It is thus not possible for the end portal to be pivoted away from the guide, for example in order to provide access to the payload, without the top being pushed together. In an alternative refinement, aside from the support rollers, there is also arranged in a roller unit a guide roller which is oriented perpendicular to the support rollers, which however makes it necessary for the roller unit to be fastened pivotably to the end runner in order that the roller carriage can follow the contour. A disadvantage here is in particular the fact that the rollers are so far remote from the foremost carriage that the end runner is pivoted only by a small angle. Furthermore, it is necessary for the roller or the end runner to be arranged at a point of the end runner which is situated far below the plane of the guide, such that the end runner is of very massive form. It is also disadvantageous that the folding elements that connect the carriages effect substantially only a turning-up of the tarpaulin. Finally, each individual carriage that is not connected to the end runner has the tendency to become jammed, because it is coupled only by way of a rigid hoop to the oppositely situated carriage, such that the longitudinal beams which provide the guide must be of flexible form in relation to the hoops and carriages and end runner in order to compensate tolerances.

U.S. Pat. No. 4,740,029 A describes a tarpaulin structure for a trailer formed in the manner of a container, in the case of which the tarpaulin is attached by way of eyelets to a drive, arranged laterally in the roof region, in the form of an encircling cable pull, wherein, to a likewise attached support plate, there is attached a bow which is coupled to a front end of the tarpaulin in relation to the opening, wherein the bow is pivotable by way of a spring into a fully open position. For the control of the pivoting movement of the bow, the latter is connected to a cable.

U.S. Pat. No. 5,524,953 A describes a tarpaulin structure for a substructure in the form of a tipping body for a tipper truck, which tarpaulin structure has a top frame which bears a tarpaulin composed of weather-resistant material, wherein the top frame with the tarpaulin can be opened and closed by way of displacement along lateral guides provided on both sides of the substructure. The top frame has a multiplicity of carriages which bear in each case two bows, which are preloaded relative to one another by way of a spring arrangement. Those ends of the bows which are averted from the carriages are connected to the tarpaulin, wherein the bows of adjacent carriages are spaced apart from one another. To the foremost carriage pair there is pivotably attached a covering bow which can be adjusted in terms of its angle of inclination by way of a cam track provided on the carriage. A disadvantage here is that the covering bow must be manually actuated, and that, in the absence of a support, the foremost carriage is subject to intense unilateral load. The carriages have an overall tendency to become jammed, such that it is necessary to provide a drive which drives the carriages on both sides simultaneously.

DE 33 27 755 A1 describes a tarpaulin structure for a substructure, which tarpaulin structure is formed in the manner of a sliding top, in the case of which a top frame bears a tarpaulin composed of weather-resistant material, wherein the top frame comprises a multiplicity of carriages which are in each case captively held in a guide, provided on both sides of the roof opening, with a support roller such that said carriages cannot escape from the guide. To each carriage there is attached a substantially U-shaped bow which points in the direction of the roof opening that forms when the top is opened, wherein, on the carriage situated in each case in front thereof on both sides, there is provided a link which is articulatedly connected to the carriage and articulatedly connected to a side region of the bow. A tensile spring is coupled at one side to the carriage and at the other side to the link of the adjacent carriage, and braces the triangle formed from bow and link in the direction of a turning-up movement. To the foremost carriage there is attached a bow which is reinforced by way of a further transverse element, wherein the bow has, on its end averted from the carriage, a plate which projects perpendicularly with respect to a limb of the bow, to which plate a roller carriage is articulatedly attached, the support rollers of which are received in the guide of the support rollers of the carriage. A disadvantage of the known tarpaulin structure is that the bow cannot be pivoted up fully, or relative to the guide, in order to open up the region covered by said bow, whether this be for providing access to the payload when the tarpaulin is closed, for tipping out a payload or for opening up the roof opening to a maximum extent. A further disadvantage is the tendency of the top frame to become jammed during the pushing-together movement. Owing to the installed springs, all bows have the tendency to be turned up simultaneously, with the result that an increased force must be applied in order to close the tarpaulin structure again. A further disadvantage is that the oppositely situated carriages are not coupled without an articulated connection, such that the support rollers must be enclosed fully in a guide.

U.S. Pat. No. 1,863,957 A describes a tarpaulin structure for a substructure such as a heavy goods vehicle, in the case of which a tarpaulin composed of weather-resistant material is supported by a top frame, wherein the top frame has a multiplicity of U-shaped beams which have, on the ends, in each case one carriage which is displaceable along a guide. To the carriages there are pivotably attached in each case two bows which are connected to the tarpaulin, wherein those regions of the bows of adjacent carriages which face toward one another are spaced apart from one another. Since the beams have a tendency to become jammed during the displacement, it is necessary for the carriages to be displaced by way of an encircling displacement device provided on both sides, wherein a bow attached to the tarpaulin is articulatedly attached to the foremost carriage in the direction of the roof opening, which carriage leads the tarpaulin downward from the foremost bow. To control said bow, said covering bow is controlled by way of a fork-like slotted guide which interacts with a peg on the side of the substructure.

DE 34 18 060 A1 describes a tarpaulin structure for a substructure, which tarpaulin structure is formed in the manner of a sliding top and in the case of which a top frame bears a tarpaulin composed of weather-resistant material and arranges said tarpaulin in a folded configuration. The top frame has a multiplicity of carriages formed from a support roller, which carriages are displaceable along a guide running on both sides of the roof opening, wherein, on each carriage, there are arranged in each case two links which are coupled to one another at a joint. One of the two link pairs has, outside the articulated connection of the links, a lifting hoop which connects the oppositely situated links to one another in the manner of a bow. When the tarpaulin structure is closed, the links lie substantially horizontally in the region of the guide, whereas the links are, in the region of their articulated connection and of the lifting hoop, raised in order to arrange the tarpaulin in a folded configuration and open up the roof opening by virtue of the tarpaulin structure being pushed together. Here, it is provided that a lifting assistance means is provided which may be formed optionally by a spring, which preloads the links in an opening direction and which is arranged close to the lifting hoop, or by a manually actuable arrangement designed for turning up the links. By way of the latter, it is achieved that the rear link pairs as viewed in a closing direction are turned up first. A disadvantage of the known tarpaulin structure is in particular the fact that oppositely situated carriages are not coupled to one another by way of a joint arranged in between, and thus the top frame cannot be operated from one side, because a corresponding opening force must be introduced approximately centrally into the top frame. A further disadvantage is that either the force for turning up the link pairs must be imparted by way of a separate arrangement, which necessitates a greater introduction of energy, or else the springs must be braced during the closure of the tarpaulin structure. In the case of the solution with springs, it is moreover to be assumed that the link pairs situated closest to the roof opening are turned up first, because these have the lowest friction resistance with respect to the guide.

DE 10 2008 000 899 A1 describes a tarpaulin structure for a substructure, in the case of which a top frame bears a tarpaulin composed of weather-resistant material and arranges said tarpaulin in a folded configuration. The top frame comprises a multiplicity of carriages equipped with rollers, wherein carriages which are displaceable along a guide arranged on both sides of the roof opening are coupled to one another by way of a link arrangement. The link arrangement comprises a first link articulatedly attached to one carriage and a second articulatedly arranged on the other carriage, wherein those ends of the links which are in each case averted from the carriages are articulatedly mounted in a connecting element. For this purpose, the connecting element is formed from two parts which have in each case one peg section which can be inserted into a bore of the complementary part and which extends through a bore on the links to form the joint. In the case of the connecting element in the form of an injection-molded part, delimiting surfaces are provided which ensure that the link pair cannot advance downward beyond a substantially horizontally stretched-out position.

It is the object of the invention to specify a tarpaulin structure which, while being of low inherent weight, permits reliable coverage of a substructure.

Said object is achieved according to the invention by way of the features of an independent claim.

According to an aspect of the invention, a tarpaulin structure for a substructure, such as a heavy goods vehicle, trailer, semitrailer, railway carriage, tipper truck or container, is provided, comprising a top frame and a tarpaulin composed of weather-resistant material, wherein the top frame has a multiplicity of beams which have, on the ends, in each case a carriage which is displaceable along a guide. To each pair of oppositely situated carriages, there is pivotably attached at least one bow which, together with a bow of an adjacent carriage pair, forms a tarpaulin folding aid, wherein the bows of the tarpaulin folding aid are connected to one another. Here, the connected bows have a pivot angle limiter which permits only a limited pivoting movement of the bows; this advantageously avoids a situation in which the bows overturn during the displacement of the carriages in the direction of an open position, that is to say the rear bow in the opening direction is pivoted downward, whereas the front bow in the opening direction is pivoted upward, such that the originally adjacent basis of the bows lie over or under one another, and the top as a whole is blocked.

The pivot angle limiter preferably furthermore ensures that, in the case of a pulling action in the direction of a closed tarpaulin structure, the tensile forces introduced into the front bow are transmitted to the rear bow, and the latter does not fall down below an angular position which the tarpaulin folding aid assumes in the closed state of the tarpaulin structure. The tarpaulin duly also partially performs this function if it is connected to both bows, but the pivot angle limiter thus relieves the tarpaulin, which is susceptible to damage and the repair of which is extremely time-consuming and expensive, of load. It is expediently the case that at least the bows or the beams, but preferably both the bows and the beams, are connected to the tarpaulin, such that, when the tarpaulin structure is closed, the tarpaulin lies closely against the top frame, whereas, when the tarpaulin structure is pushed together, said tarpaulin is arranged in a folded configuration owing to the fact that it is lifted in the region of the adjacent bows abutting against one another and remains at its original height in the region of the beams.

The pivot angle limiter expediently has two receptacles for receiving, in parallel, two cylindrical tube sections, wherein, in each receptacle, one of the cylindrical tube sections can be received at the circumference. In the circumference of the receptacles, said receptacles have a slot-like recess in which a part which protrudes radially from the respective bow is captively held and, in a direction of extent of the slot, can perform only a maximum pivoting movement predefined by the delimitations of the slot. In a direction transversely with respect to the extent of the slot, the captively held part can perform no movement whatsoever, such that the pivot angle limiter simultaneously expediently prevents the movement of the two tube sections in a Y direction, that is to say in a direction of extent of the tube sections. It has to be understood that, for this purpose, the slot-like recess runs perpendicular to the axis of the tube sections or of the receptacle, wherein the angle range minus the thickness of the radially protruding part limits the pivot angle.

The pivot angle limiter is expediently in the form of a unipartite plastics part, which is produced for example in an injection molding process. It is however also possible for the pivot angle limiter to be formed as an aluminum diecast part, which exhibits low sensitivity to impact and damage. The pivot angle limiters can thus be produced inexpensively in large unit quantities, wherein, for the installation in the top frame, it is merely necessary for a tube section of the bow, which is assembled from multiple tube sections which are in some cases elongate and in some cases curved, to be passed through the receptacle of the pivot angle limiter, wherein the bow is subsequently assembled from its elements.

It is expediently the case that two pivot angle limiters are arranged on each pair of mutually adjacent bows, specifically in each case so as to be situated oppositely and spaced apart from the center of the bows, which are generally of U-shaped form, such that the pivot angle limiter is arranged close to in each case one limb but on the base of the U-shaped bow. Alternatively, a single pivot angle limiter may be arranged approximately in the center in the base of two bows, or else three or more pivot angle limiters may be connected to the bases of adjacent bows.

The pivoting of the bow in the pivot angle limiter is expediently limited to approximately 90°, whereby the bows can be pivoted from a fully horizontal position into a fully vertical position in the pivot angle limiter. In this way, it is firstly advantageously achieved that the same pivot angle limiter can be used for bows whose initial positions are at different angles relative to the horizontal, without the need for different pivot angle limiters to be produced for each specific pairing of bows. Moreover, the pivot angle of in each case 90° for each of the bows makes it possible, during the assembly of the bows, for these to be laid flat on the base without the risk of the pivot angle limiter being overloaded, and breaking, when the bows are pushed downward. Alternatively, in each case taking into consideration the thickness of the radially protruding part engaging into the slot, preferably of a rivet, it is also possible for the pivot angle to be set to approximately 70°, if the angle of inclination relative to the horizontal amounts to 20°, that is to say in each case in complementary fashion with respect to the angle of inclination and 90°.

Owing to the narrow form of the slot, the pivot angle limiter advantageously also prevents the connected bows from performing a relative displacement in a direction parallel to their axes, which lie in the receptacles. The fact that the bows or the bases of the bows are prevented from performing a relative displacement in the Y direction advantageously stiffens the assembly composed of the two bows, such that not only are forces transmitted from one carriage to the adjacent carriage in the X direction via the two bows and the pivot angle limiters, but furthermore, the assembly can also transmit moments.

In a preferred embodiment, it is provided that only one of the bows received in the pivot angle limiter has a central, elongate connecting piece. The pivot angle limiter holds the two bows with their bases parallel to one another, such that, in the case of two pivot angle limiters being used, the connecting region of the pivot angle limiters does not need to be implemented doubly, but rather only needs to be implemented singly, such that, in the region between two pivot angle limiters on the same assembly composed of two bows, the base of one of the two bows can be fully or partially omitted. The incomplete bow is expediently the rear bow during the opening of the tarpaulin structure, such that the force that is introduced into the front bow as a result of the displacement of the carriage is transmitted in the displacement direction via the bow to both sides of the tarpaulin structure. It is particularly preferable if, in the case of the foremost bow pair, the two bows are of complete form, in order that the mass of the foremost bow pair is higher than that of the other bow pairs, and thus the weight force of an initial turning-up movement of the bow pair is counteracted, whereby it is only the other bow pairs that fold for the purposes of lifting the tarpaulin.

It is preferably the case that, in the closed state of the tarpaulin structure, the bows assume a shallow angle of less than 45° relative to the horizontal, such that the transmission of the force introduced into the carriages is transmitted more in the direction of the guide than in a vertical direction. The angle in the closed state preferably amounts to less than 35° relative to the horizontal, particularly preferably less than 25°. What is particularly expedient is an angle relative to the horizontal of approximately 17°-23°, that is to say approximately 20°, relative to the horizontal, in the case of which the transmission of force into the X direction running in the direction of the guide is considerably more pronounced than that into the vertically running Z direction. Moreover, a shallow angle of inclination of the bows in the case of correspondingly long limbs has the effect that the length of the top of the structure can be bridged with relatively few parts, such that the tarpaulin structure as a whole has a low weight and few parts, which further reduces the force for opening the tarpaulin structure. At the same time, the height of the bows and of the beams is thus small in relation to the length of the bows; in particular, the length of the bows, that is to say the spacing of the base from the articulation points on the carriages, is at least two times, in particular three times, the height of the beam over the articulation points of the bows. In this way, it is possible to realize a tarpaulin structure of relatively low height, which correspondingly makes it possible to realize a larger volume of the substructure, for example of a container or of a tipping body, which is advantageous in particular if the overall height is limited.

In a preferred embodiment, it is provided that a rear one of the bows is arranged spaced apart from a bow arranged on an end stop of the top frame. The bow arranged on the end stop the top frame is connected to the tarpaulin and serves for displacing the latter upward when a vertical pivoting position is reached at the end stop. A rear one of the bows, that is to say that one of the bows which is arranged on the final carriage pair and which points away from the front side, is also connected to the tarpaulin, such that, when the tarpaulin structure is folded together, the rear bow is displaced into the vertical and the tarpaulin is lifted. By contrast to the other bows of the top frame, the bow provided on the end stop and the final bow of the movable part of the top frame are not connected to one another, such that the same standardized parts can be used even in the case of different dimensions of the substructure, with a changed spacing. Furthermore, the resistance that must be overcome during the collapsing of the tarpaulin structure is hereby reduced, whereby the folding is facilitated.

It is expediently provided that the beams are of (inverted) U-shaped form, and that a base of the U-shaped beam is, in the closed state of the tarpaulin structure, arranged at the same height as those regions of the bows which are averted from the carriage. This yields a tarpaulin structure which, in the closed state, lies substantially at one level if the tarpaulin is attached to the beams and to the bases of the bows. It is alternatively possible for the beam to be arranged at a lower height than the minimum height of the bows. The tarpaulin is furthermore expediently attached to the limbs of the U-shaped beams, possibly also additionally in the region of the carriages. It is possible for the tarpaulin to also be attached to the limbs of the U-shaped bows. Owing to the altogether small structural height of the tarpaulin structure, the latter can in particular expediently be used for covering containers provided for transport by road or by rail.

According to an aspect of the invention, a tarpaulin structure for a substructure, such as a heavy goods vehicle, trailer, semitrailer, railway carriage, tipper truck or container, is provided, comprising a top frame and a tarpaulin composed of weather-resistant material, wherein the top frame has a multiplicity of beams which have, on the ends, in each case a carriage which is displaceable along a guide, wherein, to each pair of oppositely situated carriages, there is pivotably attached at least one bow which, together with a bow of an adjacent carriage pair, forms a tarpaulin folding aid, wherein the bows of the tarpaulin folding aid are connected to one another, wherein the carriage has at least one upper support roller and at least one lower counterpart roller, wherein the at least one upper support roller and the at least one lower counterpart roller bear by way of a circumferential surface against the narrow sides of a guide rail, which is of rectangular cross section, of the guide, wherein at least one of the at least one upper support roller and the at least one lower counterpart roller has, to both sides of the circumferential surface, in each case one ring-shaped flange, and wherein those face sides of the two ring-shaped flanges which project beyond the diameter of the circumferential surface and which face toward one another partially encompass the wide side of the guide rail. The embodiment of the support roller or the counterpart roller which ensures the attachment of the carriage to the rectangular guide rail permits not only a displacement of the carriage in the direction of the guide rail but furthermore prevents the support roller and/or the counterpart roller from sliding out of the guide rail, by virtue of the fact that the ring-shaped flanges encompass a wide side of the guide rail, wherein the radial projecting length of the ring-shaped flanges in relation to the circumferential surface is very small. In this way, it is possible for ring-shaped flanges which in each case encompass the guide rail to be arranged both on the support roller and on the counterpart roller, and the carriage as a whole cannot follow the guide rail. In this way, the carriage can, by way of the support rollers and/or the counterpart rollers, also absorb forces in a Y direction.

The carriage expediently has two support rollers which lie vertically from above on the narrow side of the guide rail. Expediently, in the case of a counterpart roller, the latter is arranged such that it spans, with the two support rollers, an isosceles triangle, and thus bears against the lower narrow side approximately centrally between the two support rollers.

The selection of the guide rail as an elongated rectangular profiled part, composed preferably of steel or anodized aluminum, is easy to procure and/or replace, because such parts are widely available in the market in standard band form.

The guide rail is expediently attached to a lateral outer wall of the substructure by way of connecting means, wherein the connecting means extend through the wide side of the guide rail. As connecting means, use may for example be made of screws or rivets, which are expediently guided through a spacer sleeve in order for the guide rail to be attached with an as far as possible constant spacing from the outer wall of the substructure. It has to be understood that the outer wall of the substructure should in this case lie as far as possible in a plane. If the substructure has indentations or projections or recesses, the spacer sleeves should be correspondingly dimensioned such that the guide rails attached to both sides of the substructure lie in parallel planes. Since manufacturers are aware of the bulging of containers in the case of a high weight or a hot payload, the sidewalls already have a concave initial contour, which the guide rails must then follow. By virtue of the fact that the narrow side of the guide rail is directed upward, the guide rail can be arranged closely against the outer side of the substructure, wherein, outside the spacer sleeves and connecting means, the guide rail maintains a spacing to the substructure which makes it possible for the support rollers and counterpart rollers arranged on the carriage to engage around the wide sides of the guide rail. The connecting means thus expediently extend through the wide side of the guide rail centrally so as not to pose an obstruction to the support rollers and counterpart rollers.

A gap is expediently provided between the guide rail and the outer wall of the substructure, such that dirt which falls between the guide rail and the outer wall of the substructure can fall down, for example between two connecting means for the attachment of the guide rail. In order to make it possible for parts which could come to lie on the narrow side of the guide rail to fall down through said gap, the spacing of the guide rail from the outer wall of the substructure is not smaller than the extent of the narrow side of the guide rail. The spacing of the guide rail from the outer wall of the substructure is expediently equal to the extent of the narrow side of the guide rail, for example in each case 8 mm.

The thickness of the support roller or the thickness of the counterpart roller is expediently narrower than two times the extent of the narrow side of the guide rail. In this way, it is ensured that the support rollers and counterpart rollers can roll past the outer wall of the substructure without becoming stuck on the outer wall of the substructure. Since it is in fact the case that only a ring-shaped flange of the support roller or of the counterpart roller protrudes beyond the guide rail in the direction of the outer wall of the substructure, the thickness of the corresponding roller is generally considerably smaller than the spacing of the opposite wide sides of the guide rail, specifically no greater than 2-3 mm thickness of the ring-shaped flange in the case of a guide rail of 8 mm width and 40 mm height.

In a preferred embodiment, it is provided that the height of the guide rail, that is to say of the wide side thereof which is arranged vertically, is greater than the height of the support roller and/or of the counterpart roller. The support roller and/or the counterpart roller are each formed so as to be slightly smaller than the height of the guide rail.

In a particularly preferred embodiment, the guide rail is formed from multiple rail sections arranged in series, which rail sections are each attached to the outer wall of the substructure. This has the advantage that, in the event of damage, it is not necessary for the entire rail to be detached from the substructure, repaired or exchanged and fastened again; it is rather necessary only for the damaged region to be restored. Furthermore, a guide rail formed in sections also adapts better to deformations of the substructure, for example of a container whose dimensions may vary with filling or with the temperature of the filling. Finally, the embodiment of the guide rail in individual sub segments also permits the exchange of a carriage by virtue of a segment on which the carriage is arranged being detached and then pulled off the carriage, which can then be repaired or exchanged. It is no longer necessary for the entire tarpaulin structure to be dismounted, for the tarpaulin to be removed from the top frame or for multiple parts of the top frame to be uninstalled.

The material from which the guide rail is produced is expediently selected from the group comprising steel and anodized aluminum. Numerous containers are produced from aluminum, such that a guide rail composed of aluminum adapts well to the characteristics of the container. Steel is inexpensive and can be easily processed. If the aluminum is anodized, it has the same surface hardness as steel, such that the rollers composed of steel cannot damage the guide rail.

A particularly important requirement in the case of a tarpaulin structure consists in that the tarpaulin structure must not project significantly laterally beyond the width of the substructure. It is therefore expediently provided that the outer side of the guide rail is spaced apart from the outer side of the substructure by less than 25 mm, preferably by less than 20 mm and as far as possible by approximately 15 mm.

Here, it is furthermore expedient if the spacing of an outer side of the carriage to the outer side of the guide rail is smaller than the spacing of the outer side of the guide rail from an outer side of the substructure. In this way, it is advantageously the case that a tarpaulin structure of narrow construction is realized, which is nevertheless guided in stable fashion on the guide rail.

According to ae aspect of the invention, a tarpaulin structure for a substructure, such as a heavy goods vehicle, trailer, semitrailer, railway carriage, tipper truck or container, is provided, comprising a top frame, and a tarpaulin composed of weather-resistant material, wherein the top frame has a multiplicity of beams which have, on the ends, in each case a carriage which is displaceable along a guide. Here, to each pair of oppositely situated carriages, there is pivotably attached at least one bow which, together with a bow of an adjacent carriage pair, forms a tarpaulin folding aid, wherein the bows of the tarpaulin folding aid are connected to one another. A covering bow is pivotably attached—so as to point forward—to the foremost carriage pair, wherein, during displacement of the foremost carriage pair, the covering bow is pivotable, by way of a run-on bevel of the guide, from a lowered closing position into a partially raised movement position. In the lowered closing position, the covering bow is arranged approximately horizontally, whereas, in the movement position, the covering bow assumes an angle between 20° and 45°, expediently of approximately 30°.

By virtue of the fact that the covering bow is not yet fully opened when in the movement position, said covering bow stiffens the foremost carriage pair in the Y direction, in particular if the covering bow itself is also guided along the guide. The stiffening by way of the covering bow has the effect that the tensile force introduced on one side into the foremost carriage pair is introduced into the carriage pair without jamming of the beam which connects the foremost carriages, whereby, despite the lightweight structure of the top frame, the covering bow forms a stable end part with the foremost carriage pair.

It is preferably the case that the covering bow is, close to the fully opened position, pivoted from the partially raised movement position into an upright opening position. For this purpose, there is expediently provided, on the covering bow, a control lever in the form of, for example, a double angle, which interacts, close to the end region of the guide, with a counterpart stop which may be in the form of a surface, peg or roller, such that, in the case of a further displacement of the foremost carriage pair, a pivoting movement is introduced into the covering bow, which pivoting movement pivots the latter from the movement position into an upright opening position, that is to say an opening position pivoted upward by approximately 90° relative to the horizontal. In this way, it is advantageously ensured that the covering bow departs from its advantageously stiffening movement position, and is displaced into a position in which it passes into a plane substantially parallel to the other bows and beams, whereby the loading opening of the substructure is fully opened up, only when the displacement movement of the foremost carriage pair is complete. When the tarpaulin structure is moved from the open position in a closing direction again, the covering bow correspondingly moves downward again, such that the covering bow is arranged in the movement position over practically the entire travelling distance of the front carriage pair.

The covering bow expediently has at least one support roller which is displaceable along the guide. Here, the support roller expediently lies from above on a narrow side of a guide rail which is preferably of rectangular cross section, wherein the support roller has, on both sides of a circumferential surface which bears against the narrow side of the guide rail, a ring-shaped flange or a flange which protrudes radially beyond the diameter of the circumferential surface, such that the face sides, facing toward one another, of the two ring-shaped flanges partially enclose the wide side of the guide rail. In this way, the covering bow is guided along the guide rail in the X direction and Y direction and, for as long as it is lowered on the guide rail, the support rollers provided on both sides of the covering bow stabilize the covering bow such that a displacement of the covering bow in a direction transversely with respect to the extent of the guide is prevented. The fact that the support roller of the covering bow is supported on the guide also has the effect that additional stiffening of the system composed firstly of the foremost carriage pair with its support rollers and counterpart rollers and secondly of the two support rollers of the covering bow is realized, wherein the spacing of the support roller of the covering bow to the support rollers and counterpart rollers of the foremost carriage pair is constant owing to the covering bow. This yields a type of four-point carriage or double-axis carriage which additionally stiffens the drive system with the foremost carriage. In particular when the tensile forces introduced at one side in one of the two foremost carriages, the diagonally oppositely situated support roller also absorbs a pivoting moment that arises about the vertical axis owing to the driven carriage, and is thus pressed against the guide rail.

The covering bow expediently has at least one guide roller which is arranged perpendicular to the support roller and which, in the movement position of the covering bow, prevents a disengagement toward the outer wall of the substructure. In the movement position of the covering bow, the guide roller lies in a horizontal plane and rotates about a vertical axis, wherein the circumference of the guide roller is arranged such that it may, though need not, be supported circumferentially against the outer wall of the substructure or else the outer wide side of the guide rail. Here, the guide roller is expediently not permanently in contact with its counterpart, but rather serves as a reserve support in a horizontal direction transversely with respect to the movement direction (Y direction) if the ring-shaped flange of the support roller is for example not sufficient to ensure, on its own, the spacing of the carriage from the substructure. This is the case for example if, owing to deformation of or dirt on the guide rail, the support roller derails, the covering element must be lifted owing to an obstruction in the interior of the substructure, the substructure deforms or the like. In this case, the guide roller ensures that the covering bow does not abut against the substructure. Since the guide roller does not need to absorb any vertical loads, it can be designed to be smaller than the support roller of the covering bow, and expediently has a plastics ring which prevents squealing noises. Here, it must be ensured that, during the pivoting from the closed position of the covering bow into the movement position and during the pivoting from the movement position into the open position of the covering bow, the guide roller is also displaced in a way in which it cannot readily roll, such that, owing to the selected embodiment with a plastics circumference, the friction resistance in the event of contact is reduced, and moreover, scraping noises and marks are avoided.

In a preferred refinement, it is provided that the guide roller is spaced apart further than the support roller from an articulation point of the covering bow. In this way, it is advantageously achieved that, as a result of the deformation of the covering bow, which is also desired to a certain extent as a resilient deflection, it is primarily the case that the support roller is displaced in a horizontal transverse direction with respect to the guide, and, owing to the relatively large spacing from the articulation point, the guide roller only has to absorb said movements at a secondary level.

The covering bow preferably has at least one pivot roller which is arranged at an angle of less than 90° relative to the support roller and which, during the pivoting movement of the covering bow, that is to say from the closed position of the covering bow into the movement position or from the movement position into the opened position and vice versa, supports the covering bow. Whereas, during the displacement along the guide, the guide roller, owing to its horizontal arrangement in the case of use with the outer wall of the substructure or of the guide rail, provides support without great resistance, the guide roller is, during the pivoting movements performed by the covering bow, situated rather in an impeding or braking position owing to its orientation. During the pivoting of the covering bow upward from the movement position into the open position, it is more the case, over a major part of the pivoting travel, that no part of the substructure is present any more against which the guide roller could realize support in the Y direction. Therefore, the pivot roller is arranged such that it can be supported against parts of the substructure or against parts fastened thereto, such that, during the pivoting of the covering bow, a disengagement of the covering bow toward the substructure is prevented. Here, it must be observed that, in particular during the pivoting from the movement position into the open position of the covering bow, the support roller of the covering bow passes out of engagement with the guide rail, such that the support roller can no longer prevent the disengagement of the covering bow toward the substructure. Also, it is necessary, despite the small spacing of the support roller to the substructure, to prevent these from colliding with one another or rubbing against one another.

The bearing arrangement of the pivot roller expediently runs perpendicular to a pivot axis of the covering bow. In this way, the pivot roller is arranged approximately tangentially on the circular pivoting movement performed by the pivot bow, whereby at any rate a component of the pivoting movement is supported by the rolling of the pivot roller.

The support roller is expediently spaced apart further than the pivot roller from an articulation point of the covering bow, such that, during the pivoting movement, the support of the covering bow is rather performed by the pivot roller, and a situation is prevented in which, despite the provision of the pivot roller, the support roller collides with the substructure or with fixed parts attached thereto.

During the pivoting of the covering bow from the movement position into the opened position, the pivot roller guides the covering bow; in the case of the displacement movement between movement position and closed position, said pivot roller supplements at least the support roller. In this way, the covering bow can be formed with a lower weight, such that the lifting of the covering bow from the movement position into the opened position is facilitated.

It is possible for the function of the guide roller and of the pivot roller to thereby be combined in one component by virtue of a ball being mounted in a ball socket on the covering bow.

The rollers, that is to say the support roller, the guide roller and/or the pivot roller, are expediently arranged on a plate which projects from the covering bow, wherein a plate of said type is provided on both sides for interaction with the guide. By way of the arrangement on a plate, which expediently forms a downward elongation of the covering bow in the region of its limbs in the pivoting direction, and which is expediently attached in each case to a massive lever arm, it is advantageously achieved that no parts obstruct a complete opening of the covering bow. It is expediently the case that the bearing axes of the rollers in each case assume an angle relative to one another, whereby the rollers can collectively expediently support all movements of the covering bow.

According to an aspect of the invention, a tarpaulin structure for a substructure, such as a heavy goods vehicle, trailer, semitrailer, railway carriage, tipper truck or container, is provided, comprising a top frame and a tarpaulin composed of weather-resistant material, wherein the top frame has a multiplicity of beams which have, on the ends, in each case a carriage which is displaceable along a guide, wherein, to each pair of oppositely situated carriages, there is pivotably attached at least one bow which, together with a bow of an adjacent carriage pair, forms a tarpaulin folding aid, wherein the bows of the tarpaulin folding aid are connected to one another, wherein a covering bow is pivotably attached to the foremost carriage pair, and wherein the covering bow is supported during a pivoting movement by a pivot roller whose axis is arranged approximately perpendicular to the pivot axis.

According to an aspect of the invention, a tarpaulin structure for a substructure, such as a heavy goods vehicle, trailer, semitrailer, railway carriage, tipper truck or container, is provided, comprising a top frame and a tarpaulin composed of weather-resistant material, wherein the top frame has a multiplicity of beams which have, on the ends, in each case a carriage which is displaceable along a guide, wherein, to each pair of oppositely situated carriages, there is pivotably attached at least one bow which, together with a bow of an adjacent carriage pair, forms a tarpaulin folding aid, wherein the bows of the tarpaulin folding aid are connected to one another. Here, in each case a sliding unit is pivotably attached to the oppositely situated foremost carriages, which sliding units are connected to one another by way of a covering bow, wherein the sliding unit has in each case a roller which centers the covering bow during the displacement along the guide. In this way, it is advantageously achieved that sliding units connected to one another by way of the covering bow follow the foremost carriage pair, which are connected to one another by way of the beam, with a constant spacing, specifically the spacing of the articulation points of the sliding unit on the foremost carriages. Both the foremost carriage pair and the pair of sliding units are attached by way of support rollers to the guide, such that a form of double-axis frame is realized which forms a rectangle in space, which rectangle is defined by the carriages or the sliding unit and more specifically the rollers thereof, which converts a force introduced into the foremost carriage into an effective propulsion action. This is because, aside from the tensile force introduced in the direction of the guide rail, a pivoting moment about a vertical axis also acts about the attachment of the support rollers of the driven foremost carriage, which pivoting movement introduces, by way of the rigid covering bow, which is however at least resiliently preloaded in position, an impulse into the sliding unit spaced apart diagonally from the driven foremost carriage, which sliding unit thus, by way of its support roller, supports the movement in the displacement direction. If the tarpaulin structure is closed, the moment rotates owing to the pulling of the foremost roller carriage in the opposite direction, and the impulses transmitted to the sliding unit that precedes the foremost carriage.

The spacing of the support roller of the sliding unit from the adjacent foremost carriage expediently amounts to between 5% and 25%, preferably between 7% and 15%, particularly preferably between 8% and 12%, and optimally approximately 10%, of the spacing of the oppositely situated guides. In the stated ranges, particularly expedient stiffening of the double-axis arrangement is realized.

The covering bow expediently has a large mass, which pushes the sliding unit against the guide. To prevent the covering bow from jumping off, it must introduce an adequately high load into the support roller of the sliding unit. In this way, a situation is prevented in which, in the case of adverse introduction of force into the foremost carriage, the moment transmitted to the covering bows and to the two sliding units has the effect that one of the sliding units is lifted, and thus the covering bow becomes jammed, or at least rolling of the support rollers along the guide roller with minimal friction is no longer ensured.

The sliding unit has at least one roller in the form of a support roller, which rolls by way of a circumferential surface on an upper narrow side of a rail, which is of rectangular cross section, of the guide. In this way, reliable support of the covering bow against the guide is realized. For this purpose, the support roller expediently has, on both sides of the circumferential surface, in each case a ring-shaped flange, wherein those face sides of the two ring-shaped flanges which project beyond the diameter of the circumferential surface and which face toward one another partially enclose a wide side of the guide rail. In this way, it is ensured that the support roller is coupled to the guide rail even in a horizontal transverse direction with respect to the displacement direction, such that the support roller also absorbs forces acting in said transverse direction. Furthermore, the sliding unit may have a guide roller which, at least in the closed position and in the movement position, can support the covering bow from the outside against a substructure or against parts fastened thereto.

The guide rollers of oppositely situated sliding units preferably have a greater spacing than the oppositely situated support rollers of the sliding units, such that said guide rollers are substantially used either when a force deforms the covering bow on one side and the direction of the substructure or when the substructure is deformed. Even if the support rollers are lifted out of the rail counter to the weight load, which pushes them downward, of the covering bow, the guide rollers prevent a collision of the covering bow with the substructure or grinding of the covering bow against the substructure.

It is expediently the case that each of the two foremost carriages has at least one upper support roller and at least one lower counterpart roller, the axes of which run parallel to the axes of the support roller of the sliding unit.

In a preferred refinement, the covering bow has bracing means which preload the sliding unit in the direction of the substructure. Since the covering bow, despite its mass, runs the risk of inadvertently being pivoted upward about the point of articulation on the foremost carriage pair, the bracing means ensure that the covering bow, or the support rollers thereof, is/are pressed into the track of the guide. The bracing means may in particular brace the two limbs of the covering bow together, such that these are preloaded in both directions onto the substructure, wherein the guide roller prevents a collision occurring. The loading of the limbs of the covering bow toward one another is then transmitted by the support rollers and the ring-shaped flange is thereafter the rail. Moreover, this prevents the covering bow from spreading, and thus the two support rollers passing out of the rail, and the covering bow becoming wedged on the substructure. Alternatively or in addition, it is advantageously provided that the bracing means are arranged on a curved bow section of the covering bow, for example as diagonal lugs which stiffen the two limbs of the curved section of the covering bow. In this way, too, if this is provided at both curved both sections, the bow is preloaded to a certain extent in the direction of the substructure, and spreading is counteracted.

The sliding unit expediently has a plate which is attached to the covering bow and on which the rollers are also arranged, whereby a high level of pre-assembly is possible.

According to an aspect of the invention, a tarpaulin structure for a substructure, such as a heavy goods vehicle, trailer, semitrailer, railway carriage, tipper truck or container, is provided, comprising a top frame and a tarpaulin composed of weather-resistant material, wherein the top frame has a multiplicity of beams which have, on the ends, in each case a carriage which is displaceable along a guide, wherein, to each pair of oppositely situated carriages, there is pivotably attached at least one bow which, together with a bow of an adjacent carriage pair, forms a tarpaulin folding aid, wherein the bows of the tarpaulin folding aid are connected to one another. Here, the bow attached to the pair of foremost carriages is pivotable altogether only on the two foremost carriages, such that the bow, as a relatively stiff part, transmits the pivoting movement from one side, into which a force can be introduced for opening purposes, to the opposite side. In interaction with the beam which connects the two foremost carriages to one another transversely with respect to the extent of the guide, the bow prevents jamming of the foremost carriages relative to the guide, such that a pulling force introduced into one foremost carriage is transmitted via the beam and by the carriage into the oppositely situated foremost carriage. In this way, it is advantageously ensured that the straight running of the carriages in the top frame is particularly expedient.

The bow attached to the pair of foremost carriages preferably transmits, via the bow, connected thereto, of the adjacent pair, a force in the direction of the guide, such that a pulling force introduced into one of the foremost carriages is transmitted in the guide direction to the adjacent carriage. In this way, the further carriages of the top frame can, if a pulling force is introduced into only one of the foremost carriages, be moved already without the carriages bearing against one another in a flush-abutting manner, specifically by virtue of the pulling force in the direction of the guide being transmitted via the bows, which for this purpose are arranged in preferably flat form, the component of which pulling force is thus transmitted more intensely in the displacement direction than into the vertical for the lifting of the tarpaulin. When one of the bow pairs folds for the purposes of lifting the tarpaulin, the transmission of the force in the direction of the guide decreases, and in the corresponding region, it is firstly the case that the tarpaulin is folded, and then, it is necessary for the force acting on the carriage to be transmitted by sliding of the adjacent carriage. Since it is then however the case that the axes of the adjacent carriages are already relatively close together, it is more likely for jamming to occur than if said axes were spanned by the adjacent bows to form a large rectangle as seen in plan view.

It is expediently the case that the bow attached to the pair of foremost carriages also transmits, via the bow, connected thereto, of the adjacent pair of carriages, a force for lifting the tarpaulin, that is to say in the vertical direction. Owing to the flat arrangement of the bows, said force is considerably smaller, at least in the case of the foremost bow pair, than the force transmission in the direction of the guide.

It may expediently be provided that the bow attached to the pair of foremost carriages is, by way of the bow, connected thereto, the adjacent pair of carriages, loaded in a direction counter to the lifting of the tarpaulin, in order to ensure as long as possible an introduction of force in the direction of the guide. In particular, said loading may be such that the angle of inclination of the bows is smaller than in the case of the other bow pairs, for example by virtue of a relatively long bow being used, or else the mass of the bows is increased, for example by virtue of a relatively heavy material being used. It is also possible for the preload of the limbs of the bows toward one another to be configured differently in the bow pairs, such that, owing to the different bracing of the bow pairs, the load counter to the turning-up direction of the tarpaulin is different. Finally, it is also possible for an expander or a spring to provide such a force which acts counter to the turning-up direction.

An embodiment is particularly advantageous in which the interconnected bows are coupled to one another, in such a way as to prevent a relative displacement, in a horizontal direction which is perpendicular to the direction of the guide, that is to say in particular, the base of the U-shaped bow cannot be displaced relative to the base of the other bow in the direction of extent of the base. In this way, the two bows are coupled in said Y direction, such that, in said direction, the bows, despite their pivotable coupling in the direction of the guide, act as a rigid unit. In this way, a force introduced about a vertical axis in the pulled foremost carriage is advantageously introduced into the adjacent carriage of the same guide rail in such a way that said adjacent carriage is displaced in the direction of the substructure and thus drives along the oppositely situated adjacent carriage. This yields stiffening of the two adjacent carriage pairs in the manner of a double-axis guide, which permits a particularly expedient transmission of the forces acting in the direction of the guide to the following carriage pairs and bows.

The carriages are expediently attached to the guide only by way of at least one upper support roller and at least one lower counterpart roller, such that the absorption forces both in the direction of the guide and in the horizontal direction perpendicular thereto, that is to say transversely with respect to the substructure, are realized by way of the support rollers. In order that the carriages with the support rollers can follow the guide even if the guide rails are not entirely parallel to one another, the beams and bows of U-shaped form can spread, whereby jamming is advantageously avoided.

In a first preferred embodiment, it is provided that the interconnected bows are connected to one another such that, by way of the bow attached to the foremost carriage, the connected bow pushes one of the carriages associated therewith in the direction of the substructure. For this purpose, the two bows jointly transmit the moment, which acts on the pulled foremost carriage as a result of the pulling action, to one of the carriages of the adjacent carriage pair, wherein, during the pulling in the opening direction, the carriage provided on the same guide is pushed in the direction of the substructure, whereas, during the closing process, the carriage situated diagonally opposite the driven foremost carriage is pushed in the direction of the substructure.

In particular in the combination with the sliding unit, which likewise effects the transmission of an impulse, the covering bow with the sliding unit and the support rollers fastened thereto, on the one hand, and the immediately adjacent carriage pair, on the other hand, realize an expedient transmission of the impulses transmitted by the torque, wherein, altogether, a type of three-axis carriage is formed which has particularly expedient running characteristics.

In a preferred embodiment, it is provided that the movable parts of the top frame fold together from rear to front. In another preferred embodiment, it is provided that the movable parts of the top frame fold together from front to rear. Movable parts of the top frame are to be regarded substantially as being the tarpaulin folding aids while the beams with the carriages attached thereto perform a collapsing movement. An embodiment is however particularly preferable in which the connected bows between the foremost carriage pair and the immediately adjacent carriage pair are lifted as a final tarpaulin folding aid during the displacement in the opening direction. The sequence in which the further bow pairs or tarpaulin folding aids are lifted is then of secondary significance, because, by way of the leading axis through the immediately adjacent carriage pair, on the one hand, and by way of the covering bow, on the other hand, a very stable running carriage concept is realized which permits durable and reliable actuation of the top frame.

The tarpaulin is preferably attached to at least one of carriages and beams, expediently both to the carriages and to the beams, specifically at the base of the resilient U-shape thereof. Since the tarpaulin not only covers the substructure but also laterally delimits the top frame, an attachment is expediently also provided in the region of the limbs of the U-shaped beams, wherein the attachment may also be realized in the region of the carriages.

The carriages are expediently designed such that the carriage comprises a flat plate, and such that the support rollers project from that side of the plate to which the bows are also pivotably attached. In this way, a situation is advantageously prevented in which movable parts, with the exception of the tarpaulin, protrude laterally beyond the plane of the flat plate of the carriage, and accordingly, a very compact structural form is realized.

The beams are expediently of U-shaped form, wherein a base of the U-shaped beam is, in the closed state of the tarpaulin structure, arranged at the same height as those regions of the bow which are averted from the carriage. It is however also possible for the beams to connect the carriages without assuming a U-shape, if the beams are, by way of example, realized as a hoop shaft or the like.

The guide is expediently arranged with a spacing to the substructure, which spacing is larger than an upwardly pointing narrow side of the guide, such that dirt that may be deposited on the narrow side can fall off to both sides, without forming bridges and thus restricting the functionality of the tarpaulin structure.

The top frame is expediently of flexible form in a horizontal transverse direction with respect to the displacement direction in order to compensate tolerances or deformations of the substructure. This is realized already by way of the U-shaped form of the bows, though the covering bow and the beams must also be correspondingly flexible in order that, in particular, regions in which the spacing of the guide rails on both sides of the guide is not constant can be run through. This is based on the concept whereby, by contrast to other tarpaulin structures in which a longitudinal member composed of aluminum follows the top frame, that is to say adapts to the dimensions thereof by deformation, it is the intention in the present case for the top frame to adapt to the deformations of the substructure.

The tarpaulin structure is, overall, characterized in that the force for opening or closing can be introduced on one side, wherein the force for opening or closing is expediently introduced at only one of the two foremost carriages. For this purpose, it is for example the case that a belt loop is attached to the foremost carriage, which belt loop can be gripped by way of a tool or else by way of a motor-driven part. Since the top frame is built over a substructure which also has a certain height, for example in the case of a tipper truck vehicle, the resistance of the top frame to the opening force must be dimensioned to be low.

The top frame is expediently wider than the substructure, such that said top frame can be attached to an outer wall of the substructure. The parts of the top frame are expediently in the form of steel parts, wherein, as an alternative to an embodiment as a steel part, the guide rail may also be in the form of an anodized aluminum part, which interacts well with movable steel parts.

According to an aspect of the invention, a pivot angle limiter for use in a tarpaulin structure is provided, which pivot angle limiter is characterized in that it is produced in a two-part tool for injection molding. Firstly, a pivot angle limiter is specified which serves for circumferentially mounting two cylindrical tube sections and which is simultaneously characterized by a production method which requires only a two-part tool or a two-part mold. This is achieved by distributing the bearing shell halves into mutually spaced-apart sections of the receptacle for the tube section, such that, on the respectively opposite side of the bearing shell section, there is sufficient space for the demolding of the tool.

According to an aspect of the invention, a pivot angle limiter for use in a tarpaulin structure is provided, which pivot angle limiter provides two receptacles for receiving, in parallel, two cylindrical sections, which receptacles each have circumferential bearing sections, wherein, in one of the circumferential bearing sections, there is formed a slot-like recess through which a pin projecting radially from the cylindrical section can be inserted, the pivot angle of which pin is limited. The slot is preferably designed such that the pin prevents the movement of the tube section in the direction of receptacle but permits a pivoting movement of the tube section in the receptacle. The pivot angle limiter can be advantageously used in tarpaulin structures of all types.

According to an aspect of the invention, a profiled part with rectangular cross section is used as a guide rail for a tarpaulin structure.

An advantageous use of the tarpaulin structure is as a cover for a container, for a heavy goods vehicle, for a railway carriage, for a swimming pool, for a carport, for a building as a replacement roof, or for a tipper truck.

Further characteristics, advantages and refinements of the invention will emerge from the following description of a preferred exemplary embodiment and from the dependent claims.

The invention will be discussed in more detail below with reference to the appended drawings on the basis of a preferred exemplary embodiment.

FIG. 1 shows a perspective view of the top frame of a tarpaulin structure according to the invention for a container in the closed state.

FIG. 2 shows a side view of the top frame from FIG. 1 in a side view.

FIG. 3 shows a perspective view of the top frame from FIGS. 1 and 2 in a partially opened position.

FIG. 4 shows a side view of the top frame from FIG. 3.

FIG. 5 shows a perspective view of the top frame from FIG. 1 to 4 in a fully opened position.

FIG. 6 shows a side view of the top frame from FIG. 5.

Figure 7:
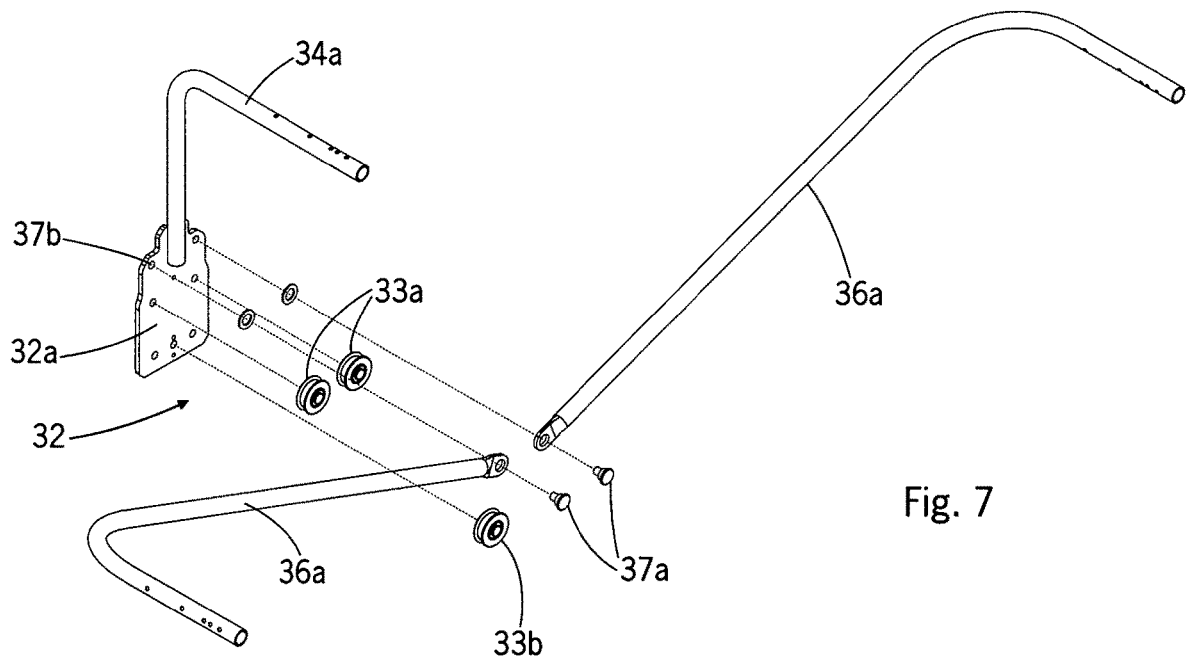
FIG. 7 shows an exploded view of a carriage from FIGS. 1 to 6.

FIG. 2 illustrates a side view of a tarpaulin structure 10 in which a tarpaulin 12 is indicated by dash-dotted lines, which tarpaulin, for better clarity, is not illustrated in the further figures. Furthermore, dashed lines are used to indicate that part of a silhouette of a container 14 over which the top frame 16 is built. The container 14 is for example in the form of a dump body in which debris or else dusty materials can be received, for which reason the coverage by way of the tarpaulin structure 10 is expedient, and under some circumstances even prescribed for the purposes of transport on a heavy goods vehicle.

The tarpaulin structure 10 has, on both sides of the container 14 on the lateral outer wall thereof, in each case one attached guide rail 20 which is composed of a multiplicity of guide rail sections which are fixed to the container outer wall so as to have a spacing thereto, for example by way of rivets, screws or other suitable fastening means which make it possible to realize a defined space into the outer wall of the container 14. In this way, the guide rail 20 is in the form of a continuous part, assembled from multiple pieces, with a rectangular profile which, in the installed state, has the top and bottom sides as narrow sides and has the wide sides parallel to the container wall.

At the rear end of the top frame 16 in the opening direction, illustrated on the left in FIG. 2, the top frame 16 projects beyond the end of the container 14, wherein, in an elongation of the outer wall of the container 14, a substantially triangular bracket or plate 22 is attached to the rear side of the container 14, on which bracket plate the guide rail 20 also extends onward. The purpose of the projecting region is to achieve that, in the open state, which can be clearly seen in particular in FIGS. 5 and 6, the entire filling opening of the container 14 can be fully opened up, by virtue of the fact that the movable parts, yet to be described, of the top frame 16 can be displaced into said projecting region. In particular, it is intended that no parts of the tarpaulin structure 16 impede the filling of the container 14. The triangular plate 22 extends higher than the plane of the guide rail 20 and forms, also at that height, a rearward elongation of the outer wall of the container 14. In practice, the sides of a container are often designated in accordance with the direction in which it is transported, wherein that side of the container 14 which is indicated by an oblique line is normally arranged at the rear on the vehicle; in the present case, however, the region in which the movable parts of the top frame 16 collect when the tarpaulin structure 10 is opened is referred to as rear end, and the front end is that which is opened up first proceeding from a closed state of the tarpaulin structure 10.

Furthermore, an end stop 24 is provided which spans the container width and which lies substantially in a plane perpendicular to the guide rails 20 and which has an inverted U shape and which is attached by way of the ends of the U to the triangular plates 22. Furthermore, a short U-shaped bow 26 is arranged in each case articulatedly at a joint 27 on the end stop 24 or on an upwardly projecting section of the plate 22, which bow is pivotable in the direction of the end stop 24 between an oblique position at an angle of approximately 40° and a raised position at an angle of approximately 90° relative to the horizontal.

The top frame 16 furthermore has a sliding top arrangement 30 which is movable along the guide rails 20 and which can be opened for the purposes of opening up the loading opening of the container 14 and which can also be closed again for covering purposes.

The sliding top arrangement 30 comprises a multiplicity of carriages 32 which can be displaced along the guide rail 20. Each oppositely situated carriage 32 in relation to a longitudinal bisector—that is to say the vertical plane is arranged centrally between the sidewalls of the container 14 or the plane which runs centrally and parallel with respect to the guide rails 20—is connected to one another by way of a U-shaped beam 34, wherein the beam 34 has two curved corner pieces 34a and optionally an elongate connecting piece 34b configured as a circular-section tube, which are assembled, whereby expedient standardization of the parts is realized. All of the beams 34 provided on the carriages 32 lie at the same height, which corresponds approximately to the height of the tarpaulin 12 when the tarpaulin structure 10 is closed. For this purpose, the tarpaulin 12 is connected to the beams 34 by way of suitable attachment means, for example by way of buckles or belts or receptacles formed in the tarpaulin 12. The number of carriages 32 and thus of beams 34 may vary depending on the length of the tarpaulin structure 10.

Furthermore, in each case a pivot bow 36 is pivotably articulated, by way of a joint 37, on each carriage 32 on both sides of the beam 34, which pivot bow is likewise assembled from an angle piece 36a and an elongate connecting piece 36b. Here, it should be noted that, on the rearmost pair of carriages 32, a short pivot bow 36' is provided which projects at a steep angle of approximately 40° relative to the horizontal, whereas the further pivot bows 36 project at a shallow angle of 20° relative to the horizontal. The pivot bows 36, 36' can be pivoted up in each case into an angular position of approximately 90° relative to the horizontal.

On the side which forms a continuation of the rest of the top frame 16, there is attached to the foremost carriage 32' a reinforced covering bow 46 which is pivotable between a substantially horizontal position, that is to say an inclination of approximately 0° relative to the horizontal, illustrated in FIGS. 1 and 2, and a vertical position, that is to say an inclination of approximately 90° relative to the horizontal, illustrated in FIGS. 5 and 6. Here, the pivoting movement of the covering bow 46 spans the tarpaulin 12. It can be seen that the covering bow 46 in turn comprises two curved bow sections 46a and an elongate tube section 46b, which are however attached to two massive lever arms 46c, which are articulatedly attached in each case to one of the carriages 32'.

It can also be seen that the rearmost pivot bow 36' and the bow 26 attached to the end stop 24 are spaced apart from one another in the closed state of a tarpaulin structure 10 and are connected only by way of the tarpaulin 12. This advantageously permits length compensation, such that the same components can also be built over containers 14 of different length. It is thus possible for the top frame 16, which in the present case has five carriage pairs 32, 32', to also have a considerably greater or lesser number of carriage pairs, for example in order to cover the roof of a heavy goods vehicle or to cover a transporter.

A special feature of a tarpaulin structure 10 for a container 14 consists in that the container 14 exhibits a high level of stiffness, such that the top frame 16 must follow the changes in shape of the container. These may arise as a result of thermal expansion, for example in the case of a hot payload, or as a result of deformation of the container, for example owing to the mass of the payload or owing to mechanical damage. Therefore, a feature of the top frame is that the U-shaped beams 34, pivot bow 36 and covering bow 46 permit a resilient deformation in the Y direction, that is to say the horizontal axis transversely with respect to the displacement direction (X axis). It is thus possible for the top frame 16 to compensate tolerances of up to 50 mm without permanent obstruction of the movement of the carriage occurring. Since damage to the guide rail 20 may occur even simply as a result of the manipulation of the container 14, said guide rail is advantageously assembled from pieces which, if required, can be in each case detached and exchanged or straightened again by bending. The angles specified above also denote the angles of the plane in which the bow lies relative to the horizontal—the pivot axis of the joints 25, 37 lies in each case in the Y direction.

Bows 36, facing toward one another, of adjacent carriages 32 are connected to one another in the region of the angle pieces 36a by way of two pivot angle limiters 38, one of which is illustrated on an enlarged scale in particular in FIGS. 10 to 16. Since one connecting piece 36b is sufficient for being connected to the tarpaulin 12 by way of the attachment means already mentioned, the elongate connecting piece 36b of one of the two bows 36, in the present case in each case of the rear of the two bows 36, is omitted. It is however also conceivable for elongate connecting pieces 36b to be provided on both interconnected bows 36.

It can be seen in particular in FIG. 2 that, in the closed state of the tarpaulin structure 10, those regions of the rigid beams 34, on the one hand, and of the pivot bows 36, on the other hand, which are spaced apart from the carriage 32 lie at one level, such that the tarpaulin 12 lies substantially in a horizontal plane.

FIG. 7 shows details of the attachment of the beams 34 and pivot bows 36 to a carriage 32. The carriage 32 comprises a carriage plate 32a to which two upper support rollers 33a and one lower counterpart roller 33b are articulatedly connected, which rollers rotate about an axis in the Y direction. The curved end piece 34a of the bow 34, as a tube piece curved through 90°, is arranged in a vertical plane in the Y direction and is attached to an upper end of the carriage plate 32a. The two angle pieces 36a of the two pivot bows 36 are attached by way of joint pins 37a to bores 37b in the carriage plate 32a of the joints 37. It can be seen that, for the joints 37, no pivoting limitation is provided—therefore, the pivot bows 36 are held in their lower angular position by way of the connection by the pivot angle limiters 38 and the spacing of the adjacent carriage pairs.

Figure 8:
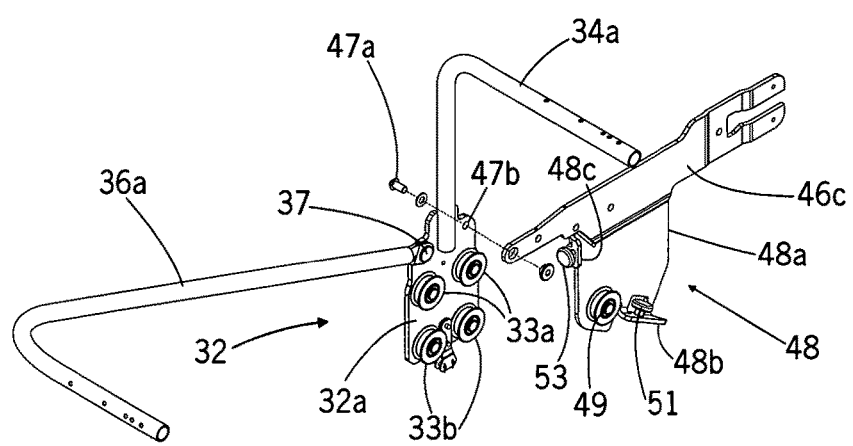
FIG. 8 shows a partially exploded view of a foremost carriage from FIGS. 1 to 6.

FIG. 8 shows details of the attachment of beam 34, pivot bows 36 and covering bow 46 to a foremost carriage 32'. The foremost carriage 32' comprises the same carriage plate 32a, to which two upper support rollers 33a and two lower counterpart rollers 33b are articulatedly attached, which rollers rotate about an axis in the Y direction. The curved end piece 34a of the bow 34 is, as a pipe piece curved through 90°, arranged in a vertical plane in the Y direction and is attached to an upper end of the carriage plate 32a. An angle piece 36a of a pivot bow 36 is articulated on the carriage plate 32a at a joint 37. The lever arm 46c of the covering bow 46 is articulatedly attached to the oppositely situated bearing eyelet 47b of the carriage plate 32a by way of a peg 47a.

It can be seen that, approximately in the center of the lever arm 46c, there is formed a sliding unit 48 which forms an elongation of said lever arm and which has a base plate 48a on which a support roller 49, which is identical to the support rollers 33a and counterpart rollers 33b, is mounted articulatedly in the Y direction. Furthermore, a small guide roller 51 is arranged on a bent portion 48b of the base plate 48a. The bent portion 48b is shaped such that, after the covering bow 46 has been pivoted up—in a manner yet to be discussed further below—through approximately 30°, the guide roller 51 lies in a horizontal plane, and, during the course of the displacement of the sliding top arrangements 30, is supported in rolling fashion on the lateral outer wall of the container. Finally, on a further bent portion 48c of the base plate 48a, there is arranged a small pivot roller 53 which lies approximately normally with respect to the plane of the covering bow 46 and which guides the covering bow in rolling fashion during the pivoting thereof against the lateral container wall while the guide roller is not capable of performing this task.

Figure 9:
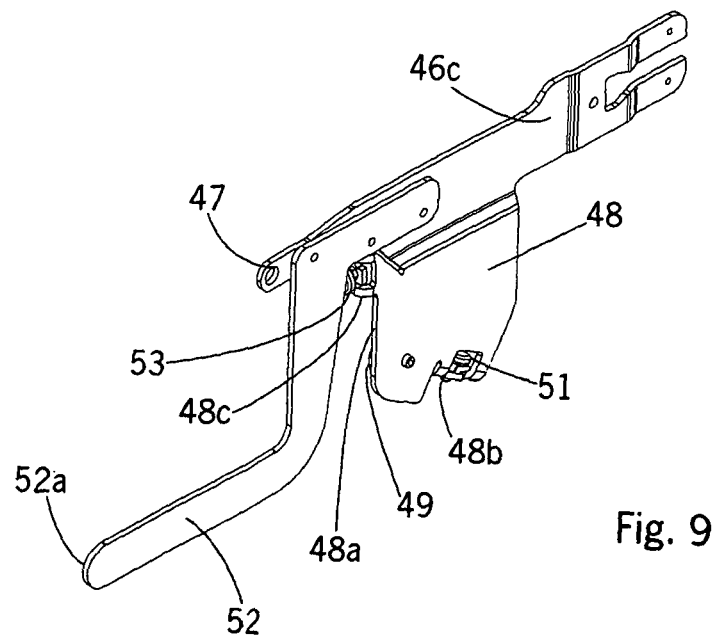
FIG. 9 shows a lever arm with, connected thereto, a double angle piece of a covering bow from the top frame of FIGS. 1 to 6.
Figure 10:
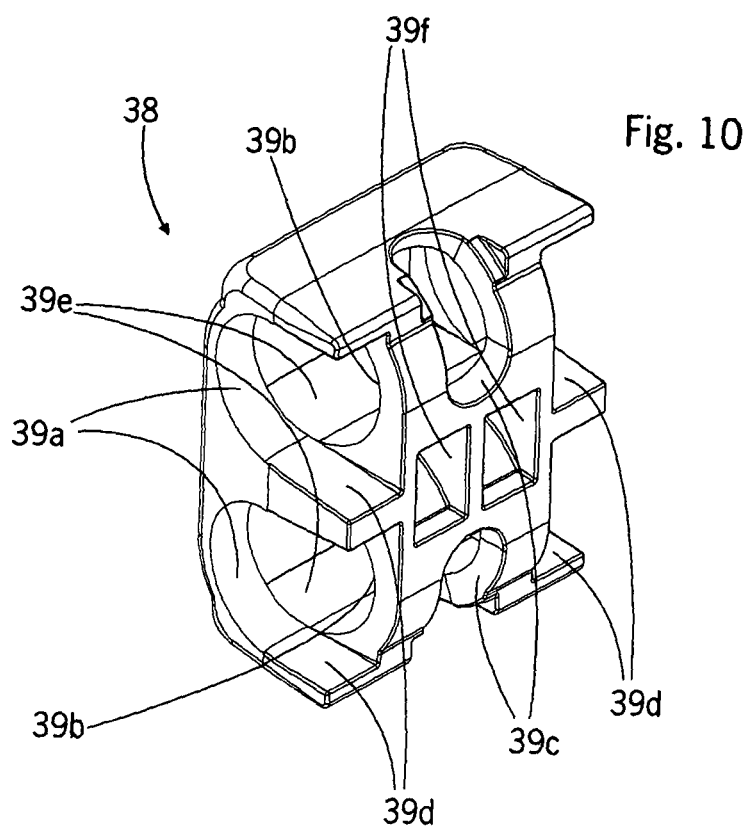
FIG. 10 shows a perspective view of a pivot angle limiter from the top frame of FIGS. 1 to 6 from below.
Figure 13:
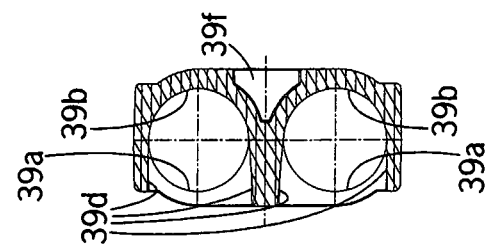
FIG. 13 shows a section through the pivot angle limiter from FIG. 11 along the line XIII-XIII.
Figure 11:
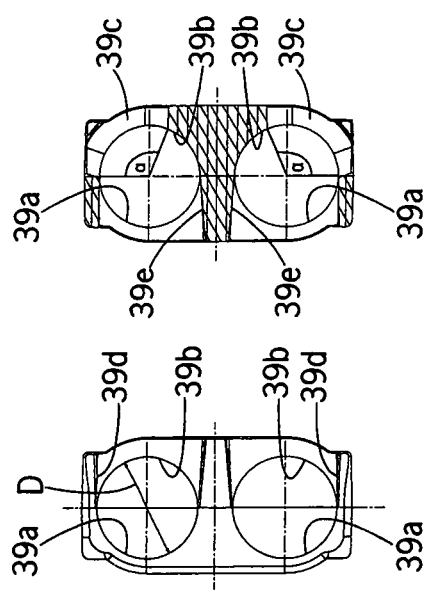
FIG. 11 shows a plan view of the pivot angle limiter from FIG. 10 from below.

FIG. 9 shows the oppositely situated lever arm 46c from the rear, wherein, as a special feature, a massive double angle piece 52 composed of steel is riveted onto the lever arm 46c, which double angle piece has a rounded outer end 52a averted from the lever arm 46c. That front carriage 32' to which the lever arm 46c with the double angle piece 52 is attached is provided for unilateral operation of the sliding top arrangements 30. For this purpose, a pulling loop, for example, is riveted onto said carriage 32', which pulling loop can be gripped by an operating person in order to pull the carriage 32' with the parts attached thereto in an opening or closing direction.

It can be seen in the drawings that the rollers 33a, 33b, 49 each have a grooved circumferential surface, wherein the groove width is equal to or slightly larger than the narrow side of the rectangular guide rail 20. In this way, the carriages 32, 32' and the sliding unit 48 are automatically centered on the narrow side of the guide rail 20, and a situation is advantageously avoided in which the rollers can slip off the slide rail. In the case of the sliding unit 48 which has no counterpart roller 33*b* and which can therefore be lifted from the guide rail 20, the centering is performed by the pivot roller 53 in a first opening phase and in a final opening phase and by the guide roller 51 in a central displacement phase.

Each carriage 32, 32' has two upper support rollers 33*a* and one or two counterpart rollers 33*b*, the circumferential surfaces of which are, in the grooved region, in contact with an upper narrow side or with a lower narrow side, respectively, of the guide rail 20. At both sides of the circumferential surface, the rollers 33*a*, 33*b* have a flange, also referred to as ring-shaped flange, which flanges enclose the wide side of the guide rail 20, which lies in a vertical plane, over a small height which corresponds to the projecting length of the ring-shaped flanges beyond the circumferential surface. The projecting length amounts to a few millimeters, such that a sufficient height of the guide rail 20 of approximately 40 mm remains in order for screws for the attachment to the container 14 to be introduced approximately centrally through the wide side. The height of the rollers 33*a*, 33*b*, likewise including ring-shaped flange, amounts to 38 mm, and is thus smaller than the height of the guide rail 20. The spacing of the guide rail 20 from the outer wall is equal to the width of said guide rail, specifically 8 mm (or else 7.5 mm). The spacing of the outer side of the carriages 32, 32' to the outer side of the guide rail 20 amounts to approximately 10 mm, such that the projecting length of the top frame 16 relative to the substructure 14 in the Y direction on each side is less than 30 mm, preferably approximately 25 mm.

It can be seen in FIGS. 3 to 6 that the front end of the guide rail 20 transitions into an obliquely downwardly sloping ramp section 20*a*. In the closed state of the tarpaulin structure, the support roller 49 of the sliding unit 48 lies on said ramp section 20*a*, such that the covering bow is held in an approximately horizontal closed position. The tarpaulin 12 is also tautened in this way.

At the rear end of the guide rail 20, on the actuation side, there is attached to the triangular plate 22 a sheet-metal stop plate 22*a* which has a face side 22*b* which, when the sliding top arrangement is almost fully open, forms a stop for the rounded end 52*a* of the double angle piece 52, which stop forces the pivot bow 46 to pivot through approximately 60° about the axis 47. It is possible for the face side 22*b* to be formed in the manner of a ramp, which duly lowers the impulse required during the pivoting movement but may disadvantageously have the effect that, as a result of the support roller 49 being lifted out of the guide rail 20, the force introduced into the carriage 32' cannot be introduced with the same effectiveness into the opposite side over the remaining very short travel.

FIGS. 10 to 16 show the pivot angle limiter 38 which connects in each case two angle pieces 36*a*, facing toward one another, of two adjacent carriages 32 to one another. The pivot angle limiter 38 is in the form of a plastics part which can be produced inexpensively as an injection-molded part, and serves primarily for guiding the pivoting-up movement of the two pivot bows 36 and for preventing a situation in which, owing to the force introduced in the X direction, the rear pivot bow 36 in the X direction is lowered, which would lead to a blockage of the further pivoting-up movement of the pivot bow 36. The pivot angle limiter 38 is of asymmetrical construction with respect to the axis H and has, on both sides of the axis H, in each case a receiving space 39 for in each case a tube section of the angle piece 36*a* of the pivot bow 36. In the direction of the axis H, there are provided multiple regions arranged one behind the other, which regions each comprise complementary half-shells 39*a* and 39*b* for the pivotable mounting of the tube sections, such that the two tube sections are altogether fully circumferentially guided. The relatively wide central section with the half-shell 39*b* has a slot-like recess 39*c* through which a blind rivet 60 (cf. FIG. 17) can be inserted which limits the pivotability of the tube section to an opening angle α of the recess 39C. After subtraction of the thickness, indicated in FIG. 14 by a marking at the ends of the slot 39*c*, of the blind rivet 60, an effective pivot angle of approximately 90° remains in each receptacle 39.

Figures 12, 14, 15:
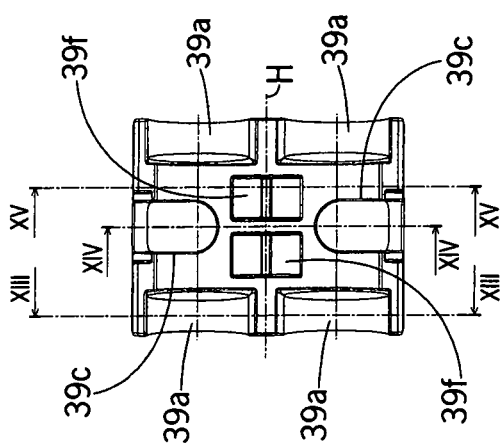
FIG. 12 shows a side view of the pivot angle limiter from FIG. 11.
FIG. 14 shows a section through the pivot angle limiter from FIG. 11 along the line XIV-XIV.
FIG. 15 shows a section through the pivot angle limiter from FIG. 11 along the line XV-XV.
Figure 16:
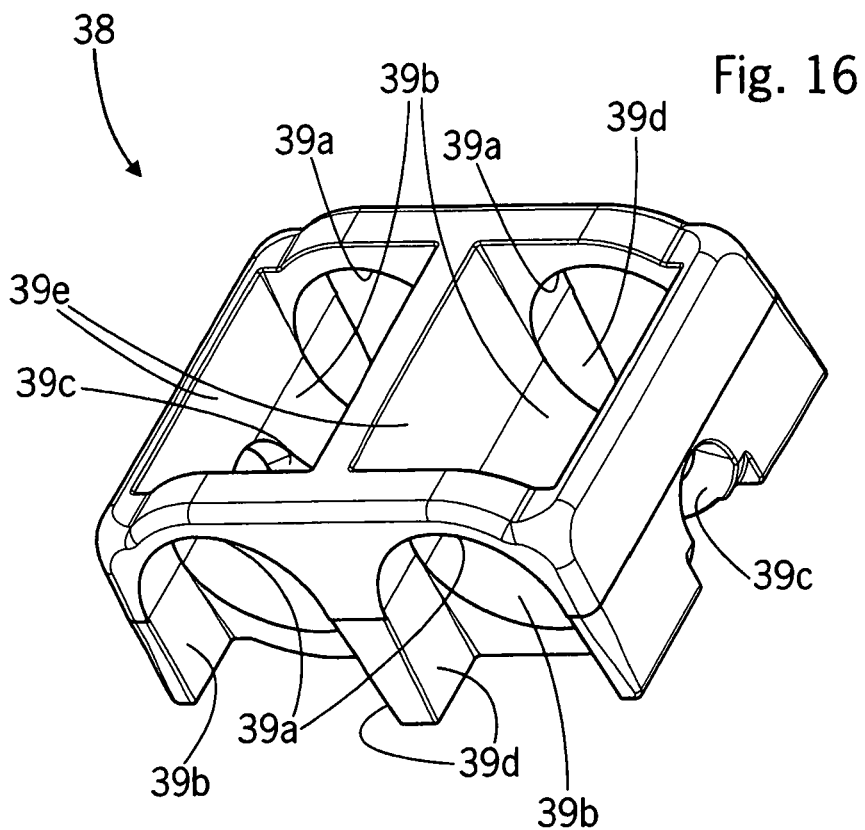
FIG. 16 shows a perspective view of the pivot angle limiter of FIGS. 10 to 15 from above.

It should be noted that the surfaces averted from the half-shells 39*a*, 39*b* comprise cutouts 39*d*, 39*e*, which possibly have a slight bevel for demolding purposes and which provide access for a molding tool in each case from one side. Furthermore, blind holes 39*f* are provided which reduce the amount of plastic required and which assist in eliminating a shrinkage dimension of the injection-molded mass. In this way, it is possible for the pivot angle limiter 38 to be produced in an injection-molding process with a two-part tool without a core or further movable parts, such as are otherwise required for the production of cylindrical openings: one tool part forms the regions 39*a*, 39*d*, 39*c*, 39*f*, and the other tool part forms the regions 39*b*, 39*e*. In FIG. 12, D denotes the diameter of the cylindrical section 36 that can be received in a receptacle 39.

Figure 17:
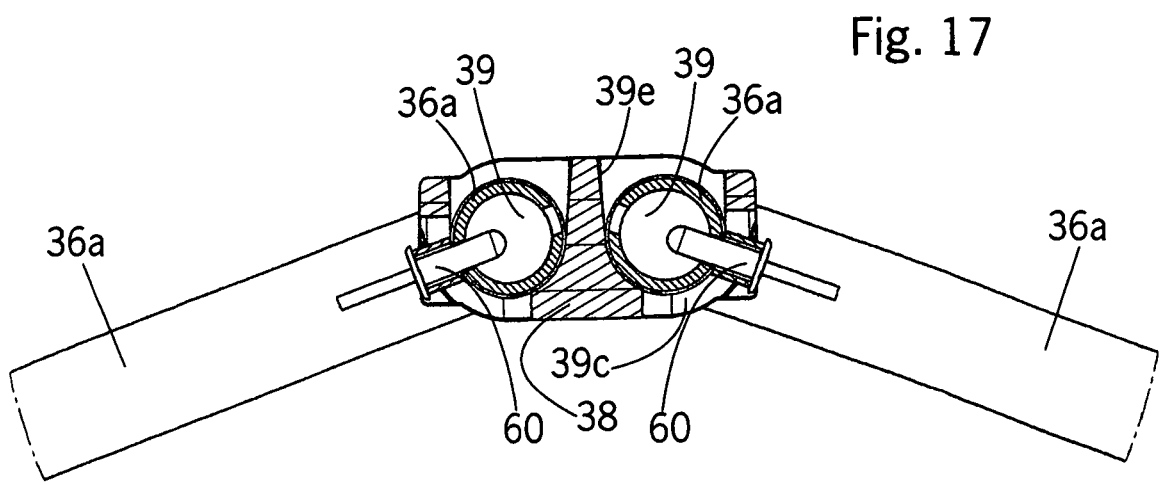
FIG. 17 shows a section through the pivot angle limiter of FIGS. 10 to 16 in the installed state.

In FIG. 17, the pivot angle limiter 38 is shown in the installed state, in which the receptacle 39 is extended through by the tube sections of the pivot bows 36, wherein a blind rivet 60 projects radially out of the tube section in each case and also extends through the recess 39*c*, such that the pivot angle that the tube section can pass through is limited to the angle α minus the thickness of the blind rivet 60, that is to say amounts to approximately 90°. It can be seen in FIG. 17 that the blind rivets 60 point away from one another to a maximum extent in the closed state of the tarpaulin structure, and that, during the pivoting-up of the pivot bows 36, the two blind rivets 60 pass into an approximately parallel position. The pivot angle limiter 38 prevents a lowering of one of the pivot bows 36 during the opening of the tarpaulin structure 10. Furthermore, the pivot angle limiter 38 couples the two pivot bows 36. Finally, the pivot angle limiter 38 limits the admissible pivot angle of the two pivot bows 36, such that the tarpaulin 12 does not need to perform this task. A further special feature of the pivot angle limiter 38 is that it permits, for the continuous pivot bow 36—that is to say that pivot bow 36 which comprises the elongate connecting piece and thus forms a closed bow—the direct coupling of the driven carriage 32 to the associated carriage 32 situated opposite with respect to the longitudinal bisector.

The top frame 16 of the tarpaulin structure can compensate tolerance fluctuations in the spacing of the two guide rails 20 of up to +/−50 mm by virtue of the limbs of the bows 36, 47 and beams 34 being spread apart from one another or pushed toward one another. The elasticity of the bows 36, 47 and beams 34 provides said play at the level of the carriages 32, 32'.

The invention functions as follows:

In the closed position of the tarpaulin structure 10 as shown in FIGS. 1 and 2, the covering bow 46 is locked against a container 14 or against the guide rail 20, for example by way of a spring-loaded bolt which extends through an opening in the lever arm 46c of the covering bow 46. The tarpaulin 12 is tautened by way of the lowered covering bow 46, wherein the tarpaulin 12 is fixed to at least one of the beams 34 and to the pivot bow 36. Moreover, the tarpaulin 12 is expediently, in the region of the carriages 32, 32', attached to these in order that the space that is intended to be covered by the tarpaulin structure 10 is also laterally secured so as to be as far as possible concealed from view and secured against access. It is possible for this purpose for the tarpaulin to have, in the region of its seam, wires or the like which tauten the seam when the tarpaulin structure 10 is closed but which are capable, when the tarpaulin structure 10 is open, of following the lifting of the tarpaulin 12 owing to the lifting of the tarpaulin lifting aid formed by two bows 36.

Proceeding from said closed position, the covering bow 46 or the front carriage 32' is unlocked, and the top frame 16 can now be operated from one side. For this purpose, a loop is attached to the foremost carriage 32' on which the double angle piece 52 is also provided, which loop allows the foremost carriage 32' to be pulled. The operating side is, in FIG. 1, the front side. If the front carriage 32' is pulled in the direction of the end stop 24, numerous kinematic effects arise.

Firstly, the covering bow 46 is pivoted into a position in which it is partially opened by approximately 30°, by virtue of the support roller 49 provided on the sliding unit 48 of the covering bow 46 being moved up the ramp 20a and coming to lie from above on the elongate guide rail 20. Since ramps 20a are provided on the guide on both sides of the top frame, the extremely rigid covering bow 46 with its support rollers 49 forms, a short distance behind the foremost carriage 32 owing to the sliding unit 48, a type of auxiliary carriage pair which exhibits increased deformation resistance for preventing spreading, because both the covering bow 46 and the beams 34 preload said combination of foremost carriage pair 32' and sliding unit pair 48 in the initial position.

Secondly, the two oppositely situated foremost carriages 32' are furthermore connected to one another by way of a continuous pivot bow 36 which additionally increases the deformation resistance; however, it should be noted that a spreading-apart or pushing-together of the vertically arranged limbs of beam 34, pivot bow 36 and covering bow 46 is desired because the container 14, in particular if it is loaded with heavy materials, is not flexible and, accordingly, the guide rail 20 follows the deformations of the container 14, and the carriages 32, 32' must then follow the guide rail. The top frame 16 must thus be displaceable even if the two guide rails 20 are not fully parallel or if the width of the container is increased or decreased.

The pivot bow 36 attached to the foremost carriage pair 32' is connected by way of two pivot angle limiters 38 to a pivot bow 36 of the adjacent carriage 32, wherein, in the case of the rear pivot bow 36, the elongate connecting piece 36b is omitted because the pivot angle limiters 38 are attached to the angle pieces 36a. In this way, it is possible for one part to be omitted, which is expedient in terms of costs. The elongate connecting piece 36b of the front pivot bow 36, or parts of the angle piece 36a, including those parts to which the pivot angle limiter 38 is attached, are received in a pocket provided in a Y direction of the tarpaulin 12, whereby a connection of the tarpaulin 12 to the tarpaulin folding aid formed by the two pivot bows 36 is realized. If the front carriage 32' is displaced rearward proceeding from the closed position of the tarpaulin structure 10, that end of the pivot bow 36 which is spaced apart from the foremost carriage 32' presses against the adjacent pivot bow 36, wherein the transmission of the force component in the X direction is reliably ensured by way of the pivot angle limiters 38. Depending on friction of the pivot bows 36 in the pivot angle limiter 38 or of the carriages 32 on the guide rail 20, either the carriage 32 moves along the guide rail 20 or the tarpaulin folding aid formed from the two pivot bows 36 is turned up by virtue of the pivot bows 36 performing a pivoting movement in the pivot angle limiter 38 and, because the spacing of the adjacent carriages 32', 32 is shortened in this way, lifting the attached tarpaulin 12.

FIGS. 3 and 4 illustrate an embodiment in which the displacement of the foremost carriage 32' in the X direction initially lifts the pivot bows 36 until the foremost carriage 32' abuts against or passes into the immediate vicinity of the adjacent carriage 32, whereby the pivot bows 36 are turned up substantially vertically, that is to say at an angle of 90° relative to the horizontal. In said turned-up position, a further pivoting of the pivot bows 36 is prevented by the pivot angle limiters 38, such that the pulling force in the X direction introduced into the foremost carriage 32' is now transmitted to the adjacent carriage 32, which similarly initiates a folding of the tarpaulin folding aid behind it, and then pulls along the next carriage 32, etc.

As soon as the inertia of the not yet fully folded-together sliding top arrangement 30 becomes low, the sliding top arrangement 30 is, as a whole, displaced rearward, and then automatically folds in the region of the rear bows 26 and 36' which are attached to the tarpaulin 12.

The inertia and/or the friction of the individual components may expediently be set so as to realize a different turning-up behavior. For example, it may be desirable for the entire sliding top arrangement 30 to firstly be displaced rearward, and for the tarpaulin to then be folded from rear to front, such that the tarpaulin folding aid composed of the pivot bows 36 between foremost carriage 32' and adjacent carriage 32 is turned up last. This configuration is advantageous in particular because the guide characteristics of the sliding top arrangement 30 are particularly expedient if the spacing between the foremost carriage 32' and the adjacent carriage per 32 is large, because then the angle of inclination of the pivot bows 36 is still small. The force transmitted in the X direction is then particularly large owing to the relatively large X component of the pivot bows 36 connected by way of the pivot angle limiters 38.

To control the turning-up sequence of the tarpaulin folding aids which are composed of the coupled pivot bows 36, there are numerous possibilities: firstly, the mass of the pivot bows 36 may be increased, for example by virtue of the elongate connecting piece 36b, which is omitted in the illustrations in the drawings, being installed, whereby the increased weight force counteracts a premature turning-up of the foremost pivot bow pair 36. It is also possible for the pivoting movement of the pivot bows 36 in the pivot angle limiter 38 to be inhibited, for example by virtue of the peg 60 which projects radially out of the pivot bow 36 being of somewhat larger form. Finally, it is also conversely possible for the tendency of the other pivot bow 36 to turn up prematurely to be supported by way of spring means, for example by virtue of the pegs 60 which project radially out of the pivot bow 36 and the pivot angle limiter 38 being connected by way of a tensile spring which supports the pivoting movement of the corresponding pivot bows 36.

When the foremost carriage 32' reaches a region a short distance in front of the fully open position of the tarpaulin structure 10, the double angle piece 52 abuts against the stop 22a, whereby, in the event of a further displacement of the carriage 32' in the closing direction, the covering bow 46 is pivoted up through approximately 60°, such that said covering bow, like the other pivot bows 36, comes to lie in a vertical position. Thus, the sliding top arrangement 30 is pushed together into its most compact form, and opens up the entire loading opening of the container 14. In this position, too, the sliding top arrangement 30 may be fixed for example by way of a latch in order to prevent the covering bow 46 from falling downward again.

During the pivoting-up of the covering bow 46 as a result of abutment of the double angle piece 52 against the stop 22a, the support roller 49 of the sliding unit 48 of the covering bow 46 passes out of engagement with the guide rail 20. In order to prevent the covering bow 46 from hereby becoming excessively mobile relative to the container 14, the pivot roller 53 is supported against the triangular plate 22, such that the covering bow 46 cannot become jammed. The guide roller 51, which in the movement position of the covering bow 46 is directed toward a side wall of the container, is used only if the support roller 49 slides out of the guide, in order to prevent a collision of the covering bow 46 of the container.

The closing movement takes place in the reverse sequence in relation to the opening movement, wherein, in this case, too, the introduction of force is performed at one side at the foremost carriage 32', for example by way of a loop attached thereto. It is however also possible for a motor-driven pulling means to be attached to one of the foremost carriages 32' in order to automatically open and close the tarpaulin 12. As the foremost carriage 32' is pulled along the guide rail 20, the tarpaulin 12 and the tarpaulin folding aids composed of the pivot bow pairs 36 unfold again until the support roller 49 of the unit 48 rolls forward over the ramp 20a and displaces the covering bow into a horizontal closing position.

During the displacement of the sliding top arrangement 30 in an opening direction, the straight running is promoted by way of two effects, which can be explained as a transmission of impulses.

The support rollers 49 of the covering bow 46 form an axis which is parallel to the foremost carriage pair 32' and which is arranged close to the axis formed by the foremost carriage pair 32', and which can therefore be referred to as a trailing double axis. Since, in the case of a pulling force being introduced into one foremost carriage 32', a moment is also introduced about a vertical axis into the trailing double axis and the trailing double axis acts approximately as a rigid structural unit, the support roller 49 of the sliding unit 48 situated diametrically opposite the pulled foremost carriage 32' is forced in the direction of the container 14. In this way, the system of the trailing double axis is braced in itself, and exhibits good straight running. During the closing movement, the vertical moment rotates into the opposite direction, and then effects the introduction of an impulse, in the direction of the container 14, into the support roller 49 of the sliding unit 48 arranged adjacent to the pulled foremost carriage 32'. Because said impulses give rise to a not insignificant load on the support rollers 49 in the Y direction, the geometry of said support rollers, which also laterally encompasses the guide rail 20 on both sides, is particularly advantageous. The guide rollers 51 provided for the case of the support rollers 49 being lifted out of the guide rail 20 also prevent the impulse from leading to an uncontrolled movement of the covering bow 46, because the sliding unit 48 has no counterpart roller.

The support rollers 33a of the carriage pair 32 adjacent to the foremost carriage pair 32' form an axis which is parallel to the foremost carriage pair 32' and which is arranged with a variable spacing owing to the interconnected bow pair 36 and which, in particular in the case of a constant, preferably maximum spacing from one another, forms a leading double axis. The moment about a vertical axis which is introduced into one foremost carriage 32' upon the introduction of a pulling force is also introduced into the leading double axis, wherein, owing to the pivot angle limiters 38 which prevent a relative movement of the coupled-together bows 36 in the Y direction, the two connected bows 36 and the adjacent carriage pair 32 react as a rigid structural unit. Accordingly, the support roller 33a and the counterpart roller 33b of the carriage 32 running on the same rail are loaded in the direction of the container 14, whereby the leading double axis is braced in itself and exhibits good straight running. During the opening movement, the introduction of impulses likewise supports the straight running of the foremost carriage pair 32'.

An embodiment with a triple axis, specifically a trailing double axis and a leading double axis, is particularly expedient.

Above, in the explanation of the invention, a foremost or front region or carriage has been defined as that which points toward the side which opens up the opening or roof opening. This is, in the case of containers, tipper bodies or heavy goods vehicles, often a side pointing counter to the direction of travel. Therefore, by definition, the opening direction of the tarpaulin structure is from front to rear, and the closing direction is from rear to front.

The invention has been discussed above on the basis of an exemplary embodiment in which the tarpaulin structure 10 covers a container 14. It has to be understood that the tarpaulin structure 10 may also be utilized for covering other mobile or transportable or static structures, which are substantially cuboid or at least have a rectangular opening, for example for the roof of a heavy goods vehicle, of a heavy goods vehicle trailer, of a bus, of a tipper body or of a semitrailer, for the roof of a railway carriage, for a static building such as a carport or a swimming pool. Lateral openings may also be covered, wherein then, the described arrangement is correspondingly used in an arrangement rotated through 90° and lying on its side, possibly with small modifications.

The invention has been discussed above on the basis of an exemplary embodiment in which the beams 34 comprise angled corner pieces 34a. It has to be understood that the beams 34 may also be composed merely of an elongate connecting piece such as the connecting piece 34b, wherein the flexibility for tolerance compensation in the Y direction may be realized for example by way of a telescopic section.

The invention has been discussed above on the basis of an exemplary embodiment in which, in the closed state of the tarpaulin structure 10, the upper edges of the beams 34 and the upper edges of the pivot bows 36 are arranged at the same height, whereby a large spacing between adjacent beams 34 is possible, because the tarpaulin 12 is attached both to the pivot bows 36 and to the beams 34. In this way, it is in particular also achieved that the tarpaulin structure is built over the container 14 in the Z direction, that is to say in the vertical, with a minimum spacing at least in the closed state, such that parts projecting slightly above the filling height of the container 14 do not block the functionality of the tarpaulin structure 10, in particular the opening and closing movements. It has to be understood that it is also possible for the beams 34 and the pivot bows 36 to also be arranged at different heights when the tarpaulin structure is closed.

The invention has been discussed above on the basis of an exemplary embodiment in which an end stop 24 is formed on the rear end of the container. It has to be understood that the same embodiment may be selected at the rear end of the tarpaulin structure 10 as at the front end, such that both the front end and the rear end are closed off by way of a covering bow 46.

The invention has been discussed above on the basis of an exemplary embodiment in which the lengths of the pivot bows 36 connected to one another between two beams are equal, whereas the pivot bows 36', 26 were in each case of shorter design. It has to be understood that the pivot bows 36 may also be dimensioned so as to be of different lengths, whereby the mass thereof is influenced, and the sequence in which the tarpaulin 12 is lifted can likewise be advantageously influenced.

The invention has been discussed above on the basis of an exemplary embodiment in which the tolerance compensation over the width in the Y direction has been realized by way of flexible curved beams 34 or bows 36 realized as tube sections. It has to be understood that the beams and pivot bows may also be formed with other, optionally hollow or filled cross sections.

The invention has been discussed above on the basis of an exemplary embodiment in which the same base plate 32a has been used for the foremost carriage 32' with two counterpart rollers 33b and for the carriages 32 with one counterpart roller 33b. It has to be understood that the carriages 32 may also be equipped with two counterpart rollers 33b, and that the base plate 32a of the foremost carriage 32' may also be formed differently than the base plate 32a of the further carriage 32.

The invention has been discussed above on the basis of an exemplary embodiment in which the beams 34 and the pivot bows 36 and the covering bow 46 are of U-shaped form with rounded corners, wherein the limbs of the beams and bows are arranged in each case substantially perpendicular to the basis of the beams 34 and bows 36, 46. In this way, it is advantageously achieved that those parts of the beams 34 and bows 36, 46 which project from the carriages 32, 32', that is to say the limbs thereof, are arranged substantially outside the loading opening of the container 14. It has to be understood that it is possible for the angle between base and limbs of the beams and bows to also be provided with a smaller or larger angle, such that the beams and bows are then of substantially trapezoidal appearance.

The invention has been discussed above on the basis of an exemplary embodiment in which the length of the limbs of the pivot bows 36 is equal for all pivot bowl pairs. It has to be understood that the limbs may also be configured with different lengths, for example two different lengths in one pairing or different lengths in different pairings, whereby the turning-up behavior of the tarpaulin folding aids can be controlled.

The invention has been discussed above on the basis of an exemplary embodiment in which the guide rail 20 is composed of multiple guide rail sections which are screwed in each case individually to the outer side of the container 14. It has to be understood that one continuous guide rail may also be used.

The invention has been discussed above on the basis of an exemplary embodiment in which the guide rails 20 run substantially rectilinearly. It has to be understood that the guide rails may also have a curved path, and specifically may be curved both in the direction toward the longitudinal bisector of the tarpaulin structure and in the vertical direction, and combinations of these.

The invention claimed is:

1. A tarpaulin structure for a substructure, such as a heavy goods vehicle, trailer, semitrailer, railway carriage, tipper truck or container, comprising:
   a top frame; and
   a tarpaulin of weather-resistant material,
   wherein the top frame has a multiplicity of beams which have, on ends thereof, in each case a carriage which is displaceable along a guide,
   wherein at least one bow is pivotally attached to each pair of oppositely situated carriages,
   wherein said at least one bow forms, together with a bow of an adjacent carriage pair, a tarpaulin folding aid,
   wherein the bows of the tarpaulin folding aid are connected to one another,
   wherein the bow attached to the pair of foremost carriages is pivotable on the two foremost carriages and transmits a pulling movement from one foremost carriage to the oppositely situated foremost carriage, and
   wherein the bow attached to the pair of foremost carriages is, by way of the bow, connected thereto, of the adjacent pair of carriages, loaded in a direction counter to the lifting of the tarpaulin, in order to ensure as long as possible an introduction of force in the direction of the guide, and
   wherein a load counter to the lifting of the tarpaulin of the tarpaulin folding aid assigned to the pair of foremost carriages exceeds a load counter to the lifting of the tarpaulin of any other tarpaulin folding aid.

2. The tarpaulin structure as claimed in claim 1, wherein the bow attached to the pair of foremost carriages transmits, by way of the bow, connected thereto, of the adjacent pair of carriages, a force for lifting the tarpaulin.

3. The tarpaulin structure as claimed in claim 1, wherein the connected bows between the foremost carriage pair and the immediately adjacent carriage pair are lifted as a final tarpaulin folding aid during the displacement in the opening direction.

4. The tarpaulin structure as claimed in claim 1, wherein the interconnected bows are connected to one another such that, by way of the bow attached to the foremost carriage, the connected bow pushes a carriage associated therewith in the direction of the guide.

5. The tarpaulin structure as claimed in claim 1, wherein the movable parts of the top frame fold together from rear to front.

6. A tarpaulin structure for a substructure, such as one of a heavy goods vehicle, a trailer, a semitrailer, a railway carriage, a tipper truck and a container, comprising:
   a top frame; and
   a tarpaulin composed of weather-resistant material,
   wherein the top frame has a multiplicity of beams which have, on the ends, in each case a carriage which is displaceable along a guide,
   wherein at least one bow is pivotally attached to each pair of oppositely situated carriages,
   wherein the at least one bow forms a tarpaulin folding aid together with a facing bow of an adjacent carriage pair,
   wherein the bows of the tarpaulin folding aid are connected to one another,
   wherein a covering bow is pivotally attached to the foremost carriage pair,
   wherein, during displacement of the foremost carriage pair, the covering bow is pivotable, by way of a run-on bevel of the guide, from a lowered closing position into a partially raised movement position, and wherein the covering bow is, close to a fully opened position of the tarpaulin structure, pivotable from the partially raised movement position, using a stop member positioned at a rear end of the guide, into an upright opening position.

7. The tarpaulin structure as claimed in claim 6, wherein the connected bows are connected by a pivot angle limiter which permits only a limited pivoting movement of the bows.

8. The tarpaulin structure as claimed in claim 1, wherein the bows of the tarpaulin folding aid connected to one another are connected by a connecting member, wherein the bows of the tarpaulin folding aid connected to one another are pivotable about a bow pivot axis of the carriage pair, wherein the connecting member prevents the bows of the tarpaulin folding aid connected to one another from performing a relative displacement in a direction parallel to the bow pivot axis.

9. The tarpaulin structure as claimed in claim 1, wherein the beams are each U-shaped and have a beam base, the bows each being U-shaped and having a bow base, and wherein the height of the beam base is, in a closed state of the tarpaulin structure, arranged at a same height as the bow base.

10. The tarpaulin structure as claimed in claim 1, wherein in a covering bow is pivotally attached to the foremost carriage pair, and wherein, on the covering bow, there is arranged at least one pivot roller which supports the covering bow during a pivoting movement and whose axis is arranged approximately perpendicular to the pivot axis of the covering bow.

11. The tarpaulin structure as claimed in claim 1, wherein a sliding unit is pivotally attached to the oppositely situated foremost carriages, wherein the sliding units are connected to one another by way of a covering bow.

12. The tarpaulin structure as claimed in claim 11, wherein the sliding unit comprises a roller which centers the covering bow during the displacement along the guide, wherein the sliding unit comprises a support roller.

13. The tarpaulin structure as claimed in claim 12, wherein the spacing of the support roller of the sliding unit from the adjacent foremost carriage amounts to between 5% and 25% of the spacing of the oppositely situated guides.

14. The tarpaulin structure as claimed in claim 11, wherein the covering bow has a large mass which presses the sliding unit against the guide.

15. A tarpaulin structure for a substructure, such as a heavy goods vehicle, trailer, semitrailer, railway carriage, tipper truck or container, comprising:
a top frame; and
a tarpaulin of weather-resistant material,
wherein the top frame has a multiplicity of U-shaped beams which have, on the ends, in each case a carriage which is displaceable along a guide,
wherein at least one U-shaped pivot bow is pivotally attached to each pair of oppositely situated carriages,
wherein said at least one pivot bow forms, together with a pivot bow of an adjacent carriage pair, a tarpaulin folding aid,
wherein the pivot bows of the tarpaulin folding aid are connected to one another using a connecting member,
wherein the pivot bow attached to the pair of foremost carriages transmits a pulling movement from one foremost carriage to the oppositely situated foremost carriage, and
wherein the pivot bow attached to the pair of foremost carriages and being part of the foremost tarpaulin folding aid is loaded in a direction counter to the lifting of the tarpaulin with an increased load with respect to any other pivot bow of any other tarpaulin folding aid, ensuring as long as possible an introduction of force in the direction of the guide avoiding a premature lifting of said pivot bows such that the movable parts of the top frame fold together from rear to front.

16. The tarpaulin structure as claimed in claim 15, wherein the force for opening or closing the tarpaulin structure can be introduced at one side, and wherein said one foremost carriage is arranged on said one side.

17. The tarpaulin structure as claimed in claim 15, wherein the U-shaped beam has a beam base, the U-shaped pivot bow having a bow base, wherein, in a closed state of the tarpaulin structure, a height of the beam base is arranged at a same height as the bow base.

18. The tarpaulin structure as claimed in claim 7, wherein the pivot angle limiter has two receptacles for receiving a cylindrical section of each of said connected bows, and wherein the receptacles have a slot-like recess by way of which a part which protrudes radially from the bow is captively held.

* * * * *